US011062158B2

(12) United States Patent
Tanaka et al.

(10) Patent No.: US 11,062,158 B2
(45) Date of Patent: Jul. 13, 2021

(54) DRIVER STATE DETERMINATION APPARATUS, METHOD, AND RECORDING MEDIUM

(71) Applicants:OMRON Corporation, Kyoto (JP); OMRON Automotive Electronics Co. Ltd., Komaki (JP)

(72) Inventors: Masato Tanaka, Kizugawa (JP); Yoshio Matsuura, Kasugai (JP); Keisuke Yokota, Kasugai (JP)

(73) Assignees: OMRON CORPORATION, Kyoto (JP); OMRON AUTOMOTIVE ELECTRONICS CO. LTD., Komaki (JP)

( * ) Notice: Subject to any disclaimer, the term of this patent is extended or adjusted under 35 U.S.C. 154(b) by 377 days.

(21) Appl. No.: 16/179,985

(22) Filed: Nov. 4, 2018

(65) Prior Publication Data

US 2019/0147274 A1 May 16, 2019

(30) Foreign Application Priority Data

Nov. 15, 2017 (JP) .............................. JP2017-219876

(51) Int. Cl.
*G06K 9/00* (2006.01)
*B60R 21/00* (2006.01)
(Continued)

(52) U.S. Cl.
CPC ........ *G06K 9/00845* (2013.01); *B60K 28/066* (2013.01); *B60R 21/00* (2013.01);
(Continued)

(58) Field of Classification Search
None
See application file for complete search history.

(56) References Cited

U.S. PATENT DOCUMENTS 7,043,056 B2* 5/2006 Edwards ............ G06K 9/00248
382/103
9,619,722 B2* 4/2017 Takeda ............... G06K 9/00597
(Continued)

FOREIGN PATENT DOCUMENTS

DE 102014100352 A1 7/2014
DE 102015214116 A1 2/2017
(Continued)

OTHER PUBLICATIONS

Japanese Office Action (JPOA) dated Mar. 3, 2020 in a counterpart Japanese patent application.
(Continued)

*Primary Examiner* — Nicholas K Wiltey
(74) *Attorney, Agent, or Firm* — Metrolex IP Law Group, PLLC

(57) ABSTRACT

Accurate driver state determination achieving safety is enabled without being affected by differences between individual drivers. A driver state determination apparatus for determining a driver state, such as distracted driving, includes a calculator that determines a direction of a vehicle driver's face or gaze based on first sensing data output from a first sensor and including an image of the driver, and calculates statistical information about a direction in which the driver looking straight ahead retains his or her gaze with respect to a forward direction of a vehicle. A correction unit corrects the determined face or gaze direction of the driver with respect to a reference direction defined as the forward direction of the vehicle based on the statistical information. A determiner determines a driver state based on a deviation of the corrected face or gaze direction of the driver from the reference direction.

12 Claims, 8 Drawing Sheets

(51) Int. Cl.
*B60K 28/06* (2006.01)
*B60W 40/09* (2012.01)
*G06K 9/32* (2006.01)

(52) U.S. Cl.
CPC ......... *B60W 40/09* (2013.01); *G06K 9/00268* (2013.01); *G06K 9/3275* (2013.01); *G06K 9/00228* (2013.01)

(56) References Cited

U.S. PATENT DOCUMENTS

| | | | |
|---|---|---|---|
| 10,140,515 B1* | 11/2018 | Waldo | G06K 9/6273 |
| 2011/0310006 A1* | 12/2011 | Edwards | G06F 3/013 |
| | | | 345/156 |
| 2014/0204193 A1 | 7/2014 | Zhang et al. | |
| 2017/0032201 A1 | 2/2017 | Bieg | |
| 2017/0140232 A1* | 5/2017 | Banno | A61B 5/1114 |
| 2019/0147263 A1* | 5/2019 | Kuehnle | G07C 5/0808 |
| | | | 340/439 |
| 2019/0318183 A1 | 10/2019 | Bieg | |
| 2020/0192476 A1 | 6/2020 | Bade et al. | |

FOREIGN PATENT DOCUMENTS

| | | |
|---|---|---|
| DE | 102015215994 A1 | 2/2017 |
| DE | 102017214546 A1 | 2/2019 |
| JP | H8-207617 A | 8/1996 |
| JP | 2002-002325 A | 1/2002 |
| JP | 2007-280375 A | 10/2007 |
| JP | 2010-067058 A | 3/2010 |

OTHER PUBLICATIONS

Office Action (DEOA) dated Jan. 8, 2021 in a counterpart German patent application.

* cited by examiner

| Accuracy-focused learning | Accuracy-focused learning count | Occasion-focused learning | Occasion-focused learning count |
|---|---|---|---|
| +5.1° σ 1.1° | 3 | +4.8° σ 1.3° | 8 |

FIG. 6A

| No. | Accuracy-focused learning value | |
|---|---|---|
| 1 | −2.8° | σ1.8° |
| 2 | +5.0° | σ1.0° |
| 3 | +0.5° | σ2.0° |

| Accuracy-focused learning value | | Accuracy-focused learning count | Occasion-focused learning value | | Occasion-focused learning count |
|---|---|---|---|---|---|
| +5.1° | σ1.1° | 3 | +4.8° | σ1.3° | 4 |

| Accuracy-focused learning value | | Accuracy-focused learning count | Occasion-focused learning value | | Occasion-focused learning count |
|---|---|---|---|---|---|
| +3.2° | σ1.3° | N | +3.0° | σ1.8° | 15 |

| No. | Accuracy-focused learning value | |
|---|---|---|
| 1 | −2.8° | σ1.8° |
| 2 | +5.0° | σ1.0° |
| 3 | +0.5° | σ2.0° |
| 4 | +3.2° | σ1.3° |

~3331

DRIVER STATE DETERMINATION APPARATUS, METHOD, AND RECORDING MEDIUM

CROSS-REFERENCE TO RELATED APPLICATION

This application claims priority to Japanese Patent Application No. 2017-219876 filed on Nov. 15, 2017, the entire disclosure of which is incorporated herein by reference.

FIELD

Embodiments of the present invention relate to a driver state determination apparatus that determines, for example, the state of a vehicle driver engaging in distracted driving, and a method and a recording medium having a program for such determination recorded thereon.

BACKGROUND

Nowadays, vehicles such as automobiles incorporate various apparatuses that assist the driver while the vehicle is traveling. One known example is a distracted driving determination apparatus that detects the face or gaze direction of the driver to determine whether the driver is engaging in distracted driving. The apparatus generates an alert to the driver engaging in distracted driving. Typically, when the face or gaze direction of the driver deviates from the forward direction by a predetermined angle or more, the driver is determined to be in distracted driving. However, the forward direction of the driver may differ from the forward direction of the vehicle. Individual drivers have different forward directions. More specifically, the directions in which drivers looking straight ahead retain their faces or gazes are known to differ by an angle of a few to a dozen degrees depending on each individual driver.

For example, Patent Literature 1 describes a distracted driving determination apparatus that changes the criterion value for detecting distracted driving in accordance with the frequency ratio between detected distracted driving and detected undistracted driving. This apparatus sets the criterion value appropriate for each driver to correct individual differences, and determines distracted driving accurately without being affected by differences between individual drivers.

CITATION LIST

Patent Literature

Patent Literature 1: Japanese Unexamined Patent Application Publication No. 8-207617

SUMMARY

Technical Problem

The technique described in Patent Literature 1 uses different criterion values for distracted driving for different drivers. However, the use of such different criterion values results in relaxing the determination criterion for drivers who often engage in distracted driving. Although this technique may increase the accuracy of driver state determination in accordance with differences between individual drivers, this technique may not achieve safety.

In response to the above issue, one or more aspects of the present invention are directed to a driver state determination apparatus that enables accurate driver state determination achieving safety without being affected by differences between individual drivers, and a method and a recording medium having a program for such determination recorded thereon.

Solution to Problem

A driver state determination apparatus according to a first aspect of the present invention includes a calculator that determines a direction of a face or a gaze of a vehicle driver based on first sensing data output from a first sensor and including an image of the driver, and repeatedly calculates statistical information about a direction in which the driver looking straight ahead retains the face or gaze with respect to a forward direction of the vehicle, a correction unit that corrects, based on the statistical information calculated by the calculator, the direction of the face or gaze of the driver determined by the calculator with respect to a reference direction defined as the forward direction of the vehicle, or corrects the reference direction, a first determiner that determines a state of the driver based on a deviation of the direction of the face or the gaze of the driver corrected by the correction unit from the reference direction, or a deviation of the direction of the face or gaze of the driver determined by the calculator from the reference direction corrected by the correction unit, and an output unit that outputs a determination result from the first determiner to the driver.

In the driver state determination apparatus according to the first aspect, the calculator determines the face or gaze direction of the vehicle driver based on the first sensing data output from the first sensor, and repeatedly calculates the statistical information about the direction in which the driver looking straight ahead retains his or her face or gaze with respect to the forward direction of the vehicle, and the correction unit corrects, based on the calculated statistical information, the determined face or gaze direction of the driver with respect to the reference direction defined as the forward direction of the vehicle, or corrects the reference direction. In other words, the forward direction (0°) in the driver's view is corrected to the forward direction (0°) used by the driver state determination apparatus, or specifically to the reference direction defined as the forward direction of the vehicle. This may be achieved by correcting the determination value for the face or gaze direction of the driver based on the first sensing data, or by correcting the reference direction defined as the forward direction of the vehicle. The first determiner determines the state of the driver based on the deviation of the corrected direction of the face or gaze of the driver from the reference direction, or the deviation of the determined direction of the face or gaze of the driver from the corrected reference direction. The output unit then outputs the determination result to the driver. For example, the angle of 0° in the face or gaze direction of the driver, which differs depending on each driver, is corrected to the reference direction predefined by the driver state determination apparatus, or for example to the angle of 0° in the forward direction of the vehicle. After the correction, the state of the driver including a distracted or undistracted state of the driver is determined. In other words, when the forward direction in the driver's view deviates from the angle of 0° in the direction used by the apparatus, the forward direction in the driver's view is used as the angle of 0° in the direction used by the apparatus. This eliminates the need for relaxing the criterion for detecting distracted driving depending on each driver, and enables accurate driver state determination achieving safety without being affected by differences between individual drivers.

A driver state determination apparatus according to a second aspect of the present invention is the apparatus according to the first aspect in which the first determiner determines whether to perform driver state determination using second sensing data output from a second sensor and indicating a state of the vehicle or to output the determination result from the output unit.

In the apparatus according to the second aspect, the first determiner determines whether to perform driver state determination using the second sensing data output from the second sensor and indicating the state of the vehicle, or to output the determination result from the output unit. In other words, this apparatus can determine whether to perform driver state determination in accordance with the state of the vehicle. When, for example; the vehicle is rounding a curve on a road, turning right or left, or changing lanes, the driver may act similarly as in distracted driving for safety checking. Such acts are prevented from being determined to be distracted driving in determining the state of the driver including a distracted state. Any distracted driver is unlikely to cause problems when the vehicle is not moving, or is parked. The driver may act similarly as in distracted driving for safety checking particularly when starting a parked vehicle. The distracted driving determination may be disabled while the vehicle is parked and for a predetermined period after the vehicle is started until the vehicle travels a predetermined distance or until the vehicle reaches a predetermined speed. In some embodiments, the distracted driving determination may be performed without outputting the determination result to produce the same advantageous effects.

A driver state determination apparatus according to a third aspect of the present invention is the apparatus according to the second aspect in which the calculator includes a first learning unit that repeatedly calculates the statistical information when a first condition excluding an erroneous learning factor is satisfied and a second learning unit that repeatedly calculates the statistical information when a second condition including the erroneous learning factor is satisfied, and the correction unit assigns a smaller weight to the statistical information calculated by the second learning unit than to the statistical information calculated by the first learning unit and corrects the face or gaze direction of the driver or the reference direction.

In the apparatus according to the third aspect, the calculator performs, in parallel, statistical information calculation with the first learning unit, which is accurate but performed infrequently when the first condition excluding factors for erroneous learning is satisfied, as well as other statistical information calculation with the second learning unit, which is less accurate but performed frequently when the second condition including the factors for erroneous learning is satisfied. This allows the first determiner to determine the state of the driver at earlier timing or immediately after the start of driving of the vehicle. The correction unit may assign a smaller weight to the less accurate statistical information than to the more accurate statistical information in the correction process. The correction results can have intended accuracy or higher.

A driver state determination apparatus according to a fourth aspect of the present invention is the apparatus according to the third aspect in which the calculator stops the statistical information calculation performed by the second learning unit when the first learning unit has calculated the statistical information a predetermined number of times.

In the apparatus according to the fourth aspect, the first learning unit generates statistical information with sufficiently high accuracy through the predetermined number of calculations. The statistical information is calculated only by the first learning unit. This eliminates excess calculations.

A driver state determination apparatus according to a fifth aspect of the present invention is the apparatus according to the third or fourth aspect further including a storage that stores statistical information calculated previously for a plurality of drivers. The calculator stops the statistical information calculation performed by the second learning unit when statistical information approximate to the statistical information calculated by the second learning unit is stored in the storage.

In the apparatus according to the fifth aspect, the second learning unit stops calculating statistical information any further when finding statistical information calculated previously approximate to the statistical information calculated by the second learning unit in the storage. Thus, when the driver currently driving the vehicle has statistical information calculated previously, the apparatus determines that the statistical information calculated by the first learning unit is accurate, and uses only the statistical information calculated by the first learning unit.

A driver state determination apparatus according to a sixth aspect of the present invention is the apparatus according to the fifth aspect in which when a possibility of a driver change is detected, the first learning unit stores, into the storage, the statistical information calculated up until then by the calculator, and the first learning unit and the second learning unit in the calculator start calculating new statistical information.

In the apparatus according to the sixth aspect, when a possibility of a driver change is detected, statistical information that has been calculated up until then with the first learning unit is stored into the storage, and calculation of new statistical information with the first and second learning units is started. The vehicle stops completely and enters a parking state usually before the vehicle power system is turned off. Thus, the possibility of a driver change is detected, and the statistical information that has been calculated up until then by the first learning unit is stored into the storage. In this manner, the calculated statistical information is stored into the storage in a reliable manner. In particular, statistical information calculated for a new driver is stored in a reliable manner.

A driver state determination apparatus according to a seventh aspect of the present invention is the apparatus according to the sixth aspect further including a second determiner that determines the possibility of a driver change based on the first sensing data or the second sensing data.

In the apparatus according to the seventh aspect, the second determiner determines a possibility of a driver change based on the first sensing data or the second sensing data. For example, the second determiner detects the possibility of a driver change by detecting the complete stop of the vehicle based on the sensing data from a speed sensor that is the second sensor and determining that the vehicle has entered the parking state based on the sensing data from a gear selector sensor and/or a parking brake sensor. In addition, for example, the driver may disappear temporarily from a monitoring image and then appear in a monitoring image again, or detection of the face or the gaze of the driver based on the first sensing data may be temporarily disabled and then enabled again. When the second determiner detects such cases based on the first sensing data from a driver camera that is the first sensor, the second determiner detects the possibility of a driver change. Thus, the possibility of a driver change can be easily determined based on the first or second sensing data. Also, the second determiner can easily determine the possibility of a driver change without complicated personal authentication processing such as face recognition or a specific operation by the driver such as self-reporting of a driver change to determine the possibility of a driver change. With no personal authentication processing, this structure may eliminate the need for higher program security level.

A driver state determination apparatus according to an eighth aspect of the present invention is the apparatus according to any one of the first to seventh aspects in which the statistical information includes an average and a deviation of the direction in which the driver looking straight ahead retains the face or gaze with respect to the forward direction of the vehicle during a predetermined period.

The apparatus according to the eighth aspect calculates statistical information including, for example, the average and the deviation of the direction in which the driver looking straight ahead retains his or her face or gaze with respect to the forward direction of the vehicle during a predetermined period. Thus, statistical information is obtained easily.

A driver state determination method according to a ninth aspect of the present invention is a driver state determination method implemented by a driver state determination apparatus that determines a state of a vehicle driver. The method includes determining, with the driver state determination apparatus, a direction of a face or a gaze of the driver based on first sensing data output from a first sensor and including an image of the driver, and repeatedly calculating statistical information about a retention direction in which the driver looking straight ahead retains the face or gaze with respect to a forward direction of the vehicle, correcting, with the driver state determination apparatus, based on the calculated statistical information, the determined direction of the face or gaze of the driver with respect to a reference direction defined as the forward direction of the vehicle, or correcting the reference direction, determining, with the driver state determination apparatus, a state of the driver based on a deviation of the corrected direction of the face or gaze of the driver from the reference direction, or a deviation of the determined direction of the face or gaze of the driver from the corrected reference direction, and outputting, with the driver state determination apparatus, a determination result for the state of the driver to the driver.

As in the first aspect, with the method according to the ninth aspect, the angle 0° of the face or gaze direction of the driver, which differs depending on each driver, may be corrected to the reference direction predefined by the driver state determination apparatus, or for example to the angle of 0° in the forward direction of the vehicle. After the correction, the state of the driver including a distracted or undistracted state of the driver is determined. This enables accurate driver state determination achieving safety without being affected by differences between individual drivers.

A non-transitory recording medium according to a tenth aspect of the present invention records a driver state determination program causing a computer to function as the units included in the driver state determination apparatus according to any one of the first to eighth aspects.

The non-transitory recording medium according to the tenth aspect allows a computer to implement the first to eighth aspects.

Advantageous Effects

The driver state determination apparatus, the driver state determination method, and the non-transitory recording medium having the driver state determination program according to the aspects of the present invention enable accurate driver state determination achieving safety without being affected by differences between individual drivers.

BRIEF DESCRIPTION OF THE DRAWINGS

FIG. 6A is a diagram showing a nonvolatile learning value table provided in the learning data storage in the driver state determination system including the driver state determination apparatus according to a second embodiment.

FIG. 6B is a diagram showing a volatile learning value table provided in the learning data storage according to the second embodiment.

FIG. 6C is a diagram showing another volatile learning value table provided in the learning data storage according to the second embodiment.

FIG. 6D is a diagram showing the nonvolatile learning value table to which learned accuracy-focused learning values have been added.

DETAILED DESCRIPTION

Embodiments according to the present invention will be described below with reference to the drawings.

Example Use

One example use of a driver state determination apparatus that determines the state of a vehicle driver according to embodiments of the present invention will be described.

Figure 1:
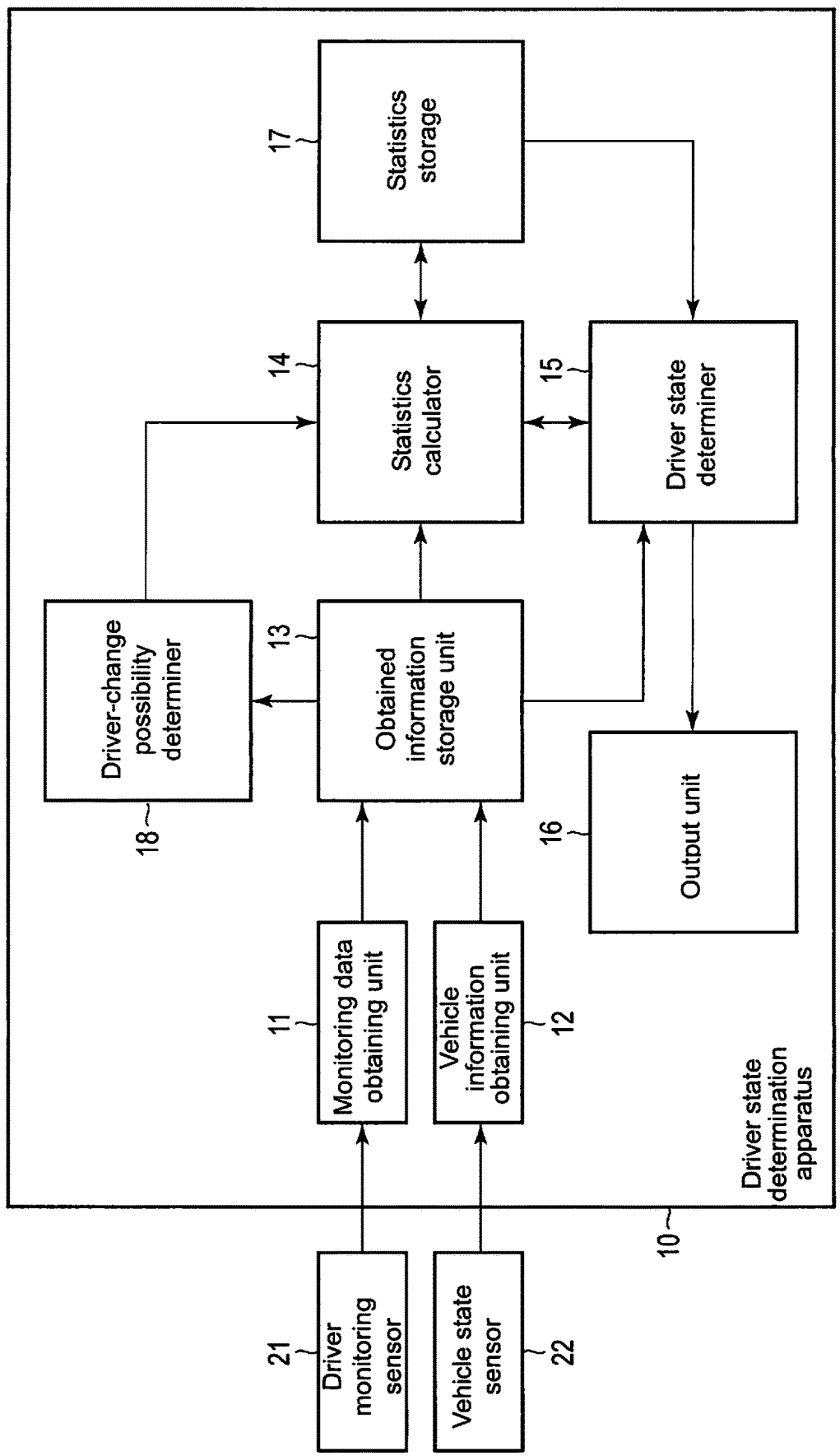
FIG. 1 is a block diagram showing an example use of a driver state determination apparatus according to one embodiment of the present invention.

FIG. 1 schematically shows the structure of the driver state determination apparatus in this example use.

A driver state determination apparatus 10 includes a monitoring data obtaining unit 11, a vehicle information obtaining unit 12, an obtained information storage 13, a statistics calculator 14 as a calculator (a first learning unit and a second learning unit) and as a correction unit, a driver state determiner 15 as a first determiner, an output unit 16, a statistics storage 17 as a storage, and a driver-change possibility determiner 18 as a second determiner.

The monitoring data obtaining unit 11 obtains first sensing data from a driver monitoring sensor 21 installed at a predetermined position in a vehicle with respect to the driver. The monitoring data obtaining unit 11 serves as a first sensor to detect acts of the driver and associated information including, for example, the retention direction in which the driver looking straight ahead retains his or her face or gaze with respect to the forward direction of the vehicle. For example, the driver monitoring sensor 21 is installed at a location for capturing an image of the face of the driver. The driver monitoring sensor 21 may be a camera placed, for example, on the dashboard, at the center of the steering wheel, beside the speed meter, or on a front pillar to capture an image of the upper part of the driver body including the face. This camera may be a still camera that captures multiple still images of the driver per second or a video camera that captures moving images of the driver. The monitoring data obtaining unit 11 digitizes image signals from the camera and obtains the digitized image signals as the first sensing data including driver images. The monitoring data obtaining unit 11 stores the obtained first sensing data in the obtained information storage 13.

The obtained information storage 13 includes, as storage media, a read-write nonvolatile memory such as a hard disk drive (HDD) or a solid state drive (SSD), and a volatile memory such as a random-access memory (RAM).

The vehicle information obtaining unit 12 obtains vehicle information from one or more vehicle state sensors 22 that each serve as a second sensor installed at a predetermined position of the vehicle. Each vehicle state sensor 22 detects information to be used for the driver-change possibility determiner 18 to determine whether the driver has been changed. Drivers may be changed usually in a parking state, in which the vehicle is completely stopped. The vehicle state sensors 22 may thus include a speed sensor for detecting the vehicle speed, a parking brake sensor for detecting the state of the parking brake, and a gear selector sensor for detecting the parking position of the gear selector in an automatic transmission car. As described above, the vehicle state sensors 22 may be one or more sensors. The vehicle information obtaining unit 12 digitizes the information detected by each vehicle state sensor 22 and obtains the digitized information as second sensing data indicating the vehicle state. Each vehicle state sensor 22 stores the obtained second sensing data into the obtained information storage 13.

During operation of the engine and/or the motor serving as the vehicle power system, the statistics calculator 14 determines feature quantities including the direction of the face or gaze of the driver based on image data for the driver stored in the obtained information storage 13. In every predetermined period, the statistics calculator 14 repeatedly calculates statistical information including the average and the deviation for the retention direction in which the driver looking straight ahead retains his or her face or gaze with respect to the forward direction of the vehicle during the predetermined period. The statistical information calculated in every predetermined period is updated and stored into the statistics storage 17 as described later. In this manner, statistical information is learned. The predetermined period may be a few seconds (X seconds).

The statistics calculator 14 calculates the feature quantity and the statistical information through one of two types of learning: accuracy-focused learning performed under a first condition excluding factors for erroneous learning and occasion-focused learning to be performed under a second condition including the factors for erroneous learning. Erroneous learning herein refers to calculating and storing unintended statistical information that deviates from other calculation results. In other words, erroneous learning refers to learning inaccurate statistical information that may cause an erroneous determination result from the driver state determiner 15 described later.

The first condition is satisfied when, for example, the vehicle is traveling straight at a speed faster than or equal to 80 km/h for at least X seconds with no direction indicator operating, during which the feature quantity during X seconds has a deviation less than or equal to a predetermined value, for example, the face or gaze direction of the driver has a deviation less than or equal to Y°. In other words, the statistical information is obtained when the vehicle is traveling on a straight road at a high speed without changing lanes and without the face or gaze direction of the driver becoming unfixed. In this case, accurate statistical information can be obtained. However, information is obtained less frequently under the first condition.

The second condition is satisfied when, for example, the vehicle is traveling straight at a speed faster than or equal to 20 km/h for at least X seconds, with no direction indicator operating. Under this condition, statistical information is obtained frequently. However, the driver is more likely to be distracted when the vehicle is traveling at a lower speed than when traveling at a higher speed. Thus, less accurate statistical information is obtained under the second condition.

Thus, the statistics calculator 14 corrects the determined value of the face or gaze direction of the driver or a reference direction by assigning a smaller weight to the frequently obtained, less accurate statistical information than to the less frequently obtained, accurate statistical information. The statistics calculator 14 described above may stop calculating statistical information through occasion-focused learning described above when statistical information is calculated a predetermined number of times through accuracy-focused learning described above.

The driver state determiner 15 corrects, based on the statistical information calculated by the statistics calculator 14, the determined direction of the face or gaze of the driver with respect to the reference direction that is defined as the forward direction of the vehicle, or corrects the reference direction. In other words, the forward direction (0°) in the driver's view is corrected to the forward direction (0°) used by the driver state determination apparatus, or specifically to the reference direction defined as the forward direction of the vehicle. This may be achieved by correcting the determination value for the face or gaze direction of the driver based on the first sensing data, or by correcting the reference direction defined as the forward direction of the vehicle.

The driver state determiner 15 then determines the state of the driver including a distracted or undistracted state of the driver based on the deviation of the corrected direction of the face or gaze of the driver from the reference direction, or the deviation of the face or gaze direction of the driver determined by the statistics calculator 14 from the corrected reference direction, and the vehicle information as the second sensing data stored in the obtained information storage 13.

The output unit 16 outputs the determination result from the driver state determiner 15 to the driver. The output unit 16 includes, for example, a speaker and an alert indicator lamp, and outputs the determination result from the driver state determiner 15 to the driver by emitting an alert sound or lighting the alert lamp. The output unit 16 may be one of the speaker and the alert indicator lamp. The alert sound and the alert indication may be implemented by a sound output function and an image display function of a navigation system included in the vehicle. In this case, the output unit 16 may output the state determination result information indicating the determination result from the driver state determiner 15 to the navigation system.

The statistics storage 17 includes, as storage media, a combination of a read-write nonvolatile memory such as an HDD or an SSD and a volatile memory such as a RAM. The nonvolatile memory in the statistics storage 17 stores previously learned statistical information about feature quantities for acts of each driver. The stored statistical information includes, for example, the average and the deviation for the retention direction of each driver's face or gaze with respect to the forward direction of the vehicle. The volatile memory in the statistics storage 17 temporarily stores statistical information calculated through accuracy-focused learning and occasion-focused learning in every calculation performed by the statistics calculator 14, as well as the count for the statistical information calculated for accuracy-focused learning and for occasion-focused learning. The statistics calculator 14 may stop calculating statistical information through occasion-focused learning when finding statistical information approximate to the calculated statistical information obtained through occasion-focused learning in the nonvolatile memory in the statistics storage 17.

The driver-change possibility determiner 18 determines the possibility of a driver change based on the vehicle information as the second sensing data stored in the obtained information storage 13. When, for example, the vehicle stops completely and enters a parking state, the driver-change possibility determiner 18 detects the possibility of a driver change. The driver-change possibility determiner 18 may also determine the possibility of a driver change based on the monitoring data as the first sensing data stored in the obtained information storage 13. For example, the driver-change possibility determiner 18 may once fail to detect the driver temporarily and then detect the driver again. In such a case, the driver-change possibility determiner 18 detects the possibility of a driver change. When the driver-change possibility determiner 18 detects the possibility of a driver change, the statistics calculator 14 that has calculated statistical information through accuracy-focused learning may store the information calculated up until then into the nonvolatile memory in the statistics storage 17. The statistics calculator 14 may further start calculating new statistical information through accuracy-focused learning and occasion-focused learning.

In the driver state determination apparatus 10 with the structure described above, the statistics calculator 14 determines the face or gaze direction of the driver based on the monitoring data as the first sensing data output from the driver monitoring sensor 21 as the first sensor, and repeatedly calculates statistical information about the direction in which the driver looking straight ahead retains his or her face or gaze with respect to the forward direction of the vehicle. Then, the driver state determiner 15 corrects, based on the calculated statistical information, the determined direction of the face or gaze of the driver with respect to the reference direction defined as the forward direction of the vehicle, or corrects the reference direction. In other words, the forward direction (0°) in the driver's view is corrected to the forward direction (0°) used by the driver state determination apparatus, or specifically to the reference direction defined as the forward direction of the vehicle. This may be achieved by correcting the determination value for the face or gaze direction of the driver based on the first sensing data, or by correcting the reference direction defined as the forward direction of the vehicle. The driver state determiner 15 then determines the state of the driver based on the deviation of the corrected direction of the face or gaze of the driver from the reference direction, or the deviation of the determined direction of the face or gaze of the driver from the corrected reference direction. The output unit 16 then outputs the determination result to the driver. For example, the angle of 0° in the face or gaze direction of the driver, which differs depending on each driver, is corrected to the reference direction predefined by the driver state determination apparatus, or for example to the angle of 0° in the forward direction of the vehicle. After the correction, the state of the driver including a distracted or undistracted state of the driver is determined. In other words, when the forward direction in the driver's view deviates from the angle of 0° in the direction used by the apparatus, the forward direction in the driver's view is used as the angle of 0° in the direction used by the apparatus. This eliminates the need for relaxing the criterion for detecting distracted driving depending on each driver, and enables accurate driver state determination achieving safety without being affected by differences between individual drivers.

In the driver state determination apparatus 10, the driver state determiner 15 also determines whether to perform driver state determination using the second sensing data indicating the state of the vehicle, or to output the determination result from the output unit. In other words, the driver state determiner 15 can determine whether to perform driver state determination in accordance with the state of the vehicle. When, for example, the vehicle is rounding a curve on a road, turning right or left, or changing lanes, the driver may act similarly as in distracted driving for safety checking. Such acts are prevented from being determined to be distracted driving. Any distracted driver is unlikely to cause problems when the vehicle is not moving, or is parked. The driver may act similarly as in distracted driving for safety checking particularly when starting a parked vehicle. The distracted driving determination may be disabled while the vehicle is parked and for a predetermined period after the vehicle is started until the vehicle travels a predetermined distance or until the vehicle reaches a predetermined speed. In some embodiments, the distracted driving determination may be performed without outputting the determination result to produce the same advantageous effects.

In the driver state determination apparatus 10, the statistics calculator 14 may also perform accurate, infrequently performed accuracy-focused learning under the first condition excluding factors for erroneous learning, in parallel with less accurate, frequently performed occasion-focused learning under the second condition including the above factors for erroneous learning. This allows the driver state determiner 15 to determine the state of the driver at earlier timing or immediately after the start of driving of the vehicle. In this case, the driver state determiner 15 performs the correction process assigning a smaller weight to statistical information calculated through less accurate occasion-focused learning than statistical information calculated through more accurate accuracy-focused learning. The correction results can have intended accuracy or higher.

The statistics calculator 14 in the driver state determination apparatus 10 generates statistical information with sufficiently high accuracy over a predetermined number of calculations through accuracy-focused learning, and can then stop occasion-focused learning and calculate statistical information only through accuracy-focused learning. This eliminates excess calculations.

The driver state determination apparatus 10 may stop calculating statistical information through occasion-focused learning further when finding statistical information approximate to statistical information calculated by the statistics calculator 14 through occasion-focused learning in the nonvolatile memory in the statistics storage 17. In other words, when the driver currently driving the vehicle has statistic information calculated previously, the apparatus determines that the resultant statistical information calculated through accuracy-focused learning is accurate, and stops occasion-focused learning.

When the driver-change possibility determiner 18 detects the possibility of a driver change, the driver state determination apparatus 10 stores statistical information that has been calculated up until then through accuracy-focused learning into the nonvolatile memory in the statistics storage 17, and calculates new statistical information through accuracy-focused learning and occasion-focused learning. The vehicle stops completely and enters a parking state usually before the vehicle power system is turned off. Thus, the driver-change possibility determiner 18 determines the possibility of a driver change, and stores the statistical information that has been calculated up until then through accuracy-focused learning into the nonvolatile memory in the statistics storage 17. Thus, the calculated statistical information is stored into the nonvolatile memory in the statistics storage 17 in a reliable manner for subsequent information detection performed for approximate statistical information as described above. In particular, statistical information calculated for a new driver is stored into the memory in a reliable manner.

In the driver state determination apparatus 10, the driver-change possibility determiner 18 may determine the possibility of a driver change based on the first sensing data or second sensing data stored in the obtained information storage 13. For example, the driver-change possibility determiner 18 determines that the vehicle is completely stopped based on the sensing data from a speed sensor as the vehicle state sensor 22, and the vehicle is parked based on the sensing data from a gear selector sensor and/or a parking brake sensor as the vehicle state sensor 22 for detecting the possibility of a driver change. In some embodiments, for example, the driver-change possibility determiner 18 may determine, based on the monitoring data transmitted from a driver camera as the driver monitoring sensor 21, the possibility of a driver change when the driver disappears temporarily from a monitoring image and appears again during monitoring, or when the detection of the driver's face or gaze using the monitoring data is temporarily disabled and then enabled again. Thus, the driver-change possibility determiner 18 easily determines the possibility of a driver change based on sensing data stored in the obtained information storage 13. Also, the driver-change possibility determiner 18 can easily determine the possibility of a driver change as described above without complicated personal authentication processing such as face recognition or a specific operation by the driver such as self-reporting of a driver change. With no personal authentication processing, this structure eliminates the need for higher program security level.

Also, the statistics calculator 14 in the driver state determination apparatus 10 may calculate statistical information including, for example, the average and the deviation for the direction in which the driver looking straight ahead retains his or her face or gaze with respect to the forward direction of the vehicle during a predetermined period. Thus, statistical information is obtained easily.

First Embodiment

One embodiment of the present invention will now be described.

Configuration
(1) System

Figure 2:
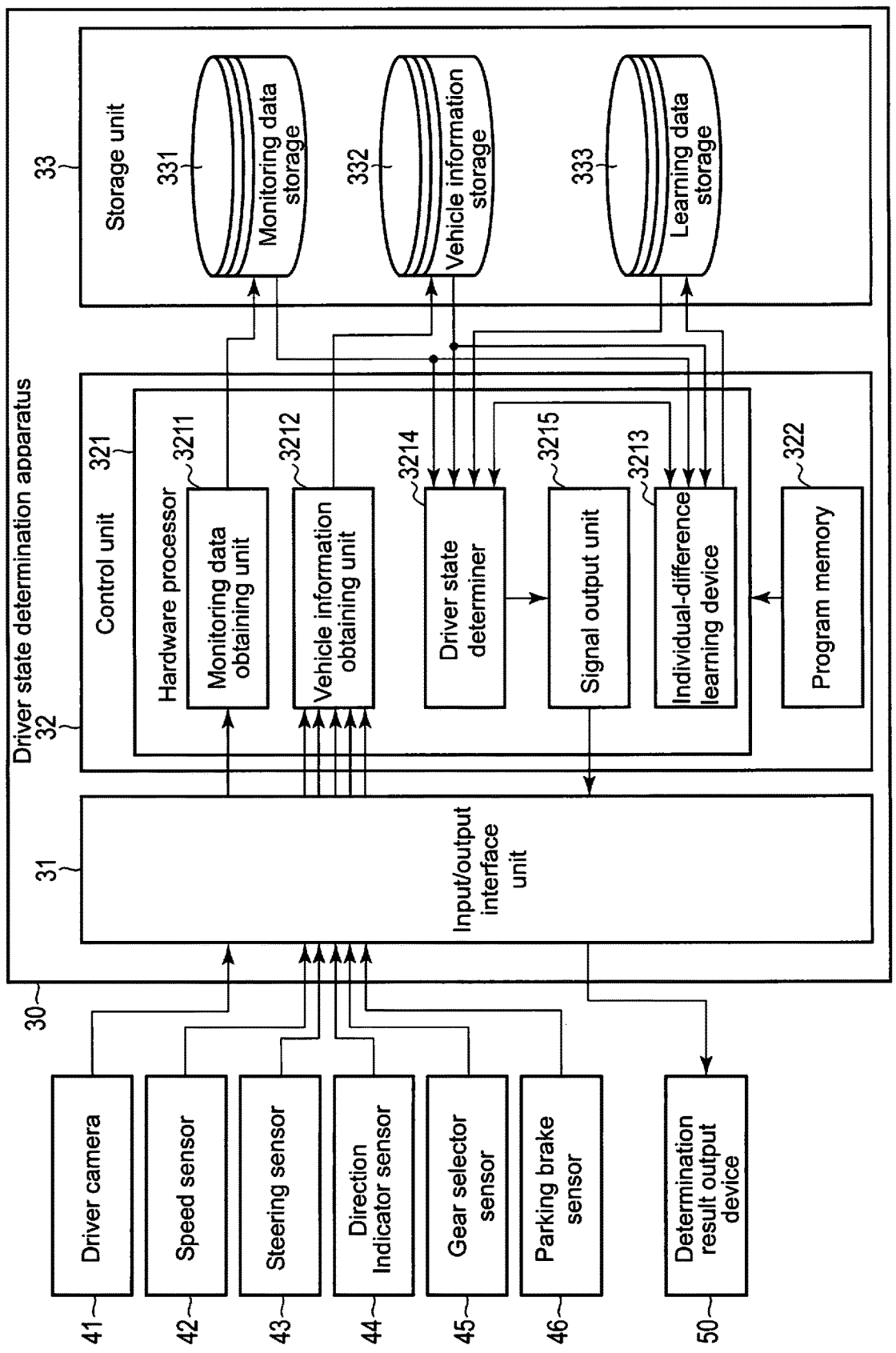
FIG. 2 is a block diagram of a driver state determination system including the driver state determination apparatus according to a first embodiment.

FIG. 2 is a diagram showing an example overall configuration of a driver state determination system including a driver state determination apparatus according to a first embodiment of the invention.

The driver state determination system includes a driver state determination apparatus 30 according to the first embodiment, various sensors 41 to 46, and a determination result output device 50.

(2) Sensors

Sensors used in the first embodiment include, for example, a driver monitoring sensor including a driver camera 41 serving as a driver monitoring sensor, and a speed sensor 42, a steering sensor 43, a direction indicator sensor 44, a gear selector sensor 45, and a parking brake sensor 46 serving as vehicle state sensors. These are mere examples, and other sensors may also be included.

The driver camera 41 is installed at a location for capturing an image of the face of the driver. The driver camera 41 is a camera placed, for example, on the dashboard, at the center of the steering wheel, beside the speed meter, or on a front pillar to capture an image of the upper part of the body of the driver including the face. The driver camera 41 may be a still camera that captures multiple still images per second or a video camera that captures moving images.

The speed sensor 42 detects the moving speed of the vehicle. The steering sensor 43 detects the steering angle of the steering wheel. The steering sensor 43 may detect a steering operation by a driver or detect the wheel angle changed by a steering operation. The direction indicator sensor 44 detects the operation of the direction indicator. The direction indicator sensor 44 may detect a direction indicator lever operation performed by the driver or detect a blinking control signal to the direction indicator blinking in response to the direction indicator lever operation.

The gear selector sensor 45 detects the parking position of the gear selector in an automatic transmission car. The gear selector sensor 45 may detect a selecting operation by a driver with the gear selector or detect a lighting control signal to the indicator for the selected position. The parking brake sensor 46 detects the state of the parking brake. The parking brake sensor 46 may detect a parking brake lever operation by a driver or detect an activation control signal for activating the parking brake. Both the gear selector sensor 45 and the parking brake sensor 46 may not be included. For example, an automatic transmission vehicle may include the gear selector sensor 45, but may not include the parking brake sensor 46. A manual transmission vehicle may simply include the parking brake sensor 46.

(3) Driver State Determination Apparatus

The driver state determination apparatus 30 includes a control unit 32, an input-output interface unit 31, and a storage unit 33.

The input-output interface unit 31 receives an image signal output from the driver camera 41, converts the received signal into digital data, and inputs the resulting data in the control unit 32. The input-output interface unit 31 also receives sensing data from each of the speed sensor 42, the steering sensor 43, the direction indicator sensor 44, the gear selector sensor 45, and the parking brake sensor 46, and inputs the data in the control unit 32. The input-output interface unit 31 further converts driver state determination result information output from the control unit 32 into an output control signal and outputs the resulting signal to the determination result output device 50.

The storage unit 33 includes, as storage media, a read-write nonvolatile memory such as an SSD or an HDD and a volatile memory such as a RAM. The storage unit 33 includes, as storage areas used in the present embodiment, a monitoring data storage 331 for monitoring data about drivers, a vehicle information storage 332 for vehicle states, and a learning data storage 333 for learning results as learning data including statistical information and the count of the learning performed.

Figures 3, 4:
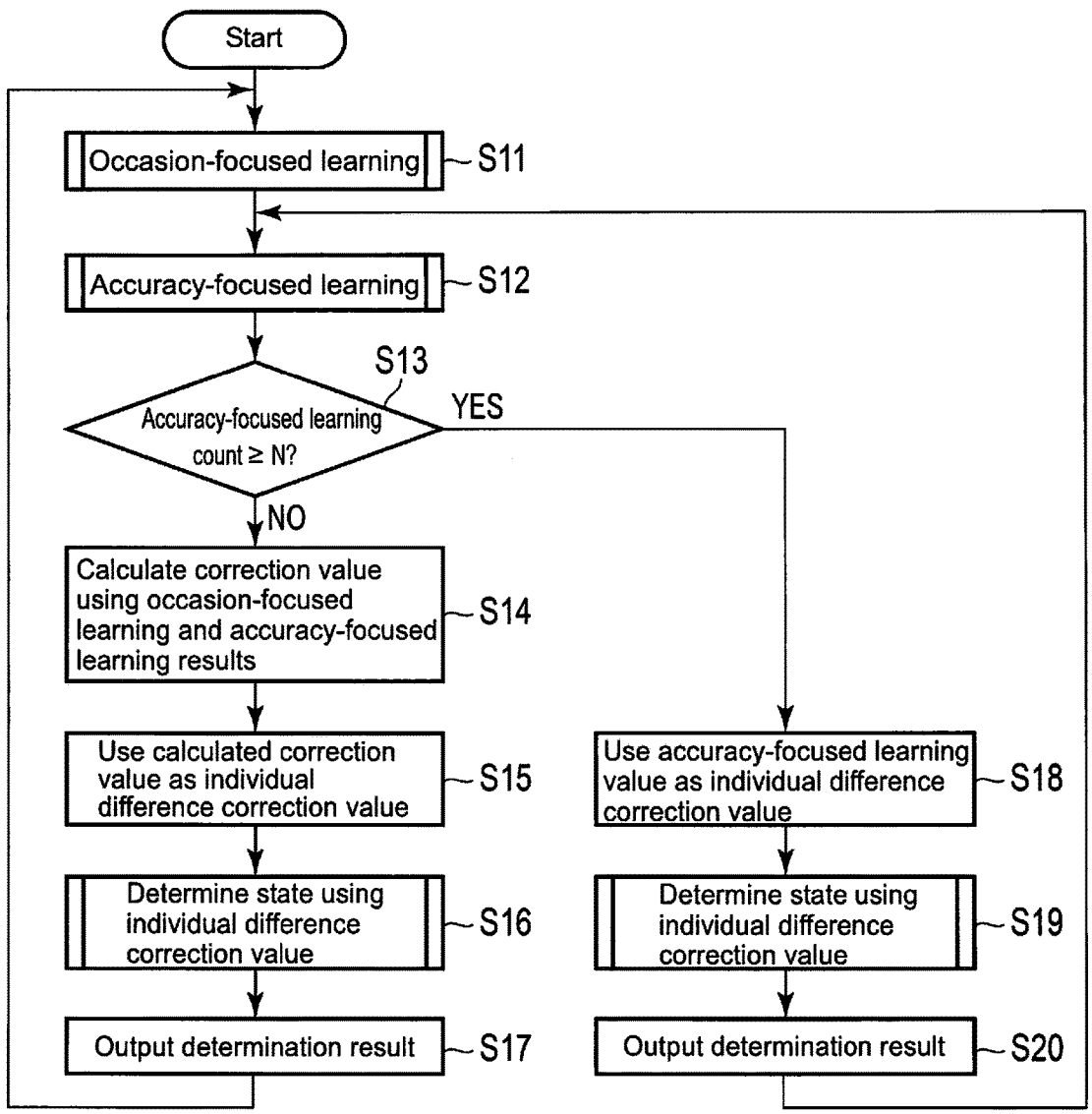
FIG. 3 is a diagram showing learning results stored in a learning data storage in the driver state determination system according to the first embodiment.
FIG. 4 is a flowchart showing the procedure and processing performed by the driver state determination system according to the first embodiment.

FIG. 3 is a diagram showing one example of learning data to be stored in the learning data storage 333. In the first embodiment, the learning data storage 333 stores an accuracy-focused learning value, which is statistical information obtained through accuracy-focused learning, and the count of the learning performed, and an occasion-focused learning value, which is statistical information obtained through occasion-focused learning, and the count of the learning performed. Such statistical information includes the average and the deviation for the direction (retention direction) in which the driver looking straight ahead retains his or her face or gaze with respect to the forward direction of the vehicle. In the example shown in FIG. 3, when the forward direction used by the driver state determination apparatus, or the reference direction defined as the forward direction of the vehicle is 0°, the retention direction of the face or gaze of the driver calculated through accuracy-focused learning has an average of +5.1° and a deviation of 1.1°. The table also shows that the learning has been performed three times. The retention direction of the face or gaze of the driver calculated through occasion-focused learning has an average of +4.8° and a deviation of 1.3°, and the learning has been performed eight times. Although the stored retention direction is expressed herein using a positive value and a negative value indicating the right and the left from the reference direction, the direction may be expressed using a positive and a negative value indicating upward and downward from the reference direction. In some embodiments, both the right-left and up-down directions may be stored. In addition, for example, the tilt of the driver's head may be stored.

The control unit 32 includes a hardware processor 321 such as a central processing unit (CPU) and a program memory 322. The control unit 32 includes a monitoring data obtaining unit 3211, a vehicle information obtaining unit 3212, an individual-difference learning device 3213, a driver state determiner 3214, and a signal output unit 3215 as software components for implementing the present embodiment. The software components are implemented by the hardware processor 321 executing programs stored in the program memory 322. Each of these software components may be a dedicated hardware component.

The monitoring data obtaining unit 3211 obtains a monitoring image of the driver from the driver camera 41. More specifically, the monitoring data obtaining unit 3211 receives, through the input-output interface unit 31, sensing data that is the digital data representing a driver image signal output from the driver camera 41, and stores the received sensing data into the monitoring data storage 331 in the storage unit 33 as monitoring data for the driver.

The vehicle information obtaining unit 3212 obtains vehicle information from each of the speed sensor 42, the steering sensor 43, the direction indicator sensor 44, the gear selector sensor 45, and the parking brake sensor 46. More specifically, the vehicle information obtaining unit 3212 receives, through the input-output interface unit 31, sensing data output from each of these sensors, and stores the received sensing data into the vehicle information storage 332 in the storage unit 33 as vehicle information.

The individual-difference learning device 3213 learns differences between individual drivers. For example, during operation of the engine and/or the motor serving as the vehicle power system, the individual-difference learning device 3213 calculates statistical information including the average and the deviation for the retention direction in which the driver looking straight ahead retains his or her face or gaze with respect to the forward direction of the vehicle, in every predetermined period (e.g., every few seconds). The driver state determiner 3214 determines a current face or gaze direction of the driver based on the monitoring data stored in the monitoring data storage 331, and inputs the determined direction into the individual-difference learning device 3213. The individual-difference learning device 3213 calculates statistical values of the retention direction in which the driver looking straight ahead retains his or her face or gaze with respect to the forward direction of the vehicle, as the feature quantity of the driver for the predetermined period based on the input face or gaze direction of the driver.

The statistical information may be calculated using two different conditions using, for example, the vehicle speed, the steering angle, and the operation of a direction indicator. The statistical information is calculated only when either of the two conditions is satisfied. The first condition defined for accuracy-focused learning is satisfied when, for example, the vehicle is traveling straight at a speed faster than or equal to 80 km/h for at least X seconds with no direction indicator operating, during which the feature quantity during X seconds has a deviation less than or equal to a predetermined value, or for example the face or gaze direction of the driver has a deviation less than or equal to Y°. This excludes factors for erroneous learning, allowing accurate statistical information to be obtained. However, information is obtained less frequently with the first condition. The second condition defined for occasion-focused learning is satisfied when, for example, the vehicle is traveling straight at a speed less than or equal to 20 km/h for at least X seconds, with no direction indicator operating. This cannot exclude factors for erroneous learning. Thus, resultant statistical information has less accuracy. However, statistical information may be obtained frequently.

The individual-difference learning device 3213 may calculate statistical information including not only the average and the deviation for the retention direction for the face or gaze of the driver during the predetermined period but also statistical information that has already been calculated (learned), or specifically, statistical information including statistical information that has been calculated up until then.

The individual-difference learning device 3213 stores, into the learning data storage 333, an accuracy-focused learning value, which is statistical information obtained through accuracy-focused learning, and the count of the learning performed, and an occasion-focused learning value, which is statistical information obtained through occasion-focused learning, and the count of the learning performed.

Also, the individual-difference learning device 3213 performs accuracy-focused learning and occasion-focused learning to calculate statistical information for the retention direction for the face or gaze of the driver, which is determined by the driver state determiner 3214 during the above predetermined period, and stores the resultant information into the learning data storage 333.

The hardware processor 321 including the individual-difference learning device 3213 starts operating when the vehicle power system is turned on, and stops operating when the vehicle power system is turned off.

The driver state determiner 3214 reads learning data calculated through accuracy-focused learning and occasion-focused learning and stored in the learning data storage 333, and corrects, based on the read learning data, the determined direction of the face or gaze of the driver with respect to the reference direction defined as the forward direction of the vehicle. In some embodiments, the individual-difference learning device 3213 may correct the reference direction based on the learning data. In other words, the forward direction (0°) in the driver's view is corrected to the forward direction (0°) used by the driver state determination apparatus, or specifically to the reference direction defined as the forward direction of the vehicle. This may be achieved by correcting the determination value for the face or gaze direction of the driver based on the first sensing data, or by correcting the reference direction defined as the forward direction of the vehicle.

In the first embodiment, this correction is achieved by the individual-difference learning device 3213 calculating an individual difference correction value based on the learning data, and then by the driver state determiner 3214 correcting the face or gaze direction of the driver, or by correcting the reference direction based on the individual difference correction value, as described in detail later.

The driver state determiner 3214 further reads, from the vehicle information storage 332, sensing data from the steering sensor 43 and the direction indicator sensor 44. The driver state determiner 3214 then determines the state of the driver including a distracted or undistracted state of the driver based on the deviation of the corrected direction of the face or gaze of the driver from the reference direction, or the deviation of the determined direction of the face or gaze of the driver from the corrected reference direction. In this case, the driver state determiner 3214 determines whether to perform driver state determination as described above, or to output the determination result based on sensing data from the steering sensor 43 or the direction indicator sensor 44. When the vehicle is rounding a curve on a road, turning right or left, or changing lanes, the driver may act similarly as in distracted driving for safety checking. Such acts may thus be prevented from being determined to be distracted driving.

The signal output unit 3215 outputs the driver state determination result information indicating the state of the driver determined by the driver state determiner 3214 to the determination result output device 50 through the input-output interface unit 31.

(4) Determination Result Output Device

The determination result output device 50 includes, for example, a speaker and an alarm indicator lamp, and outputs the driver state determination result information output from the driver state determination apparatus 30 to the driver by emitting an alarm sound or lighting the alarm lamp. The determination result output device 50 may be one of the speaker and the alarm indicator lamp. The determination result output device 50 may be implemented by a sound output function or an image display function of the navigation system included in the vehicle. The determination result output device 50 may be included in the driver state determination apparatus 30 and controlled by the signal output unit 3215.

Operation

The operation of the driver state determination system with the above configuration will now be described.

Figure 5:
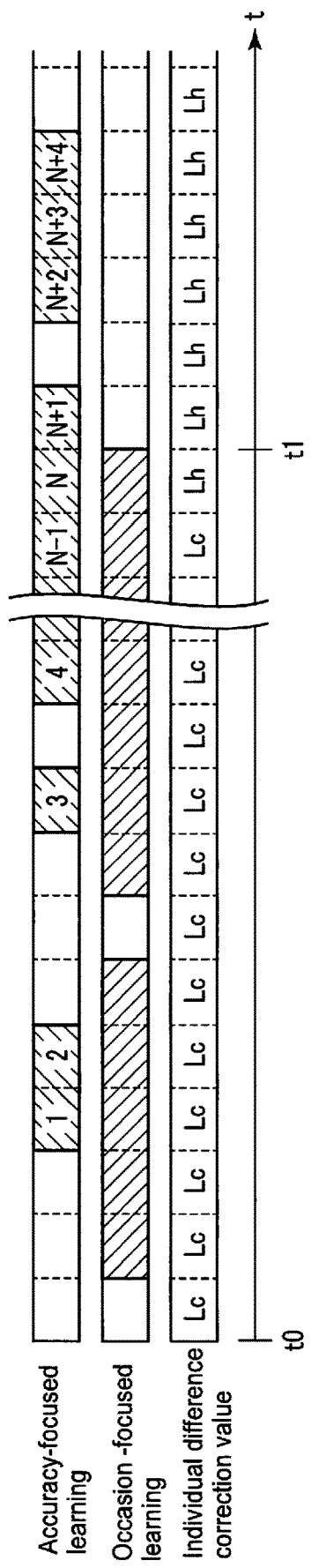
FIG. 5 is a time chart showing an example of learning that follows the procedure according to the first embodiment and the calculated individual difference correction values.

FIG. 4 is a flowchart showing the procedure and processing performed by the driver state determination system shown in FIG. 2. FIG. 5 is a time chart showing an example of learning that follows the procedure in the driver state determination system shown in FIG. 2 and the calculated individual difference correction values.

(1) Receiving Sensing Data

When the vehicle power system is turned on, the driver state determination apparatus 30, the driver camera 41 serving as a driver monitoring sensor, and the sensors 42 to 46 serving as vehicle state sensors start operating. The driver state determination apparatus 30 uses the monitoring data obtaining unit 3211 to obtain sensing data from the driver camera 41 and store the sensing data into the monitoring data storage 331 as monitoring data. The driver state determination apparatus 30 also uses the vehicle information obtaining unit 3212 to obtain sensing data from each of the speed sensor 42, the steering sensor 43, the direction indicator sensor 44, the gear selector sensor 45, and the parking brake sensor 46 and store the sensing data into the vehicle information storage 332 as vehicle information. Sensing data is repeatedly obtained and stored until the vehicle power system is turned off.

(2) Statistical Information Learning

In parallel with the sensing data obtaining operation, the driver state determination apparatus 30 starts learning statistical information through occasion-focused learning in step S11, and learning statistical information through accuracy-focused learning in step S12.

More specifically, in the driver state determination apparatus 30, the driver state determiner 3214 first determines the face or gaze direction of the driver based on the monitoring data stored in the monitoring data storage 331. The individual-difference learning device 3213 then calculates the average and the deviation for the retention direction in which the driver looking straight ahead retains his or her face or gaze with respect to the forward direction of the vehicle based on the determined direction of the face or gaze of the driver. In this case, the driver state determination apparatus 30 calculates statistical information through accuracy-focused learning when the first condition is satisfied, or when, for example, the vehicle is traveling straight at a speed faster than or equal to 80 km/h for at least X seconds with no direction indicator operating, during which the feature quantity during X seconds has a deviation less than or equal to a predetermined value, or specifically, for example, the face or gaze direction of the driver has a deviation less than or equal to Y°. Also, the driver state determination apparatus 30 calculates statistical information through occasion-focused learning when the second condition, which is more relaxed than the first condition, is satisfied, or when, for example, the vehicle is traveling straight at a speed less than or equal to 20 km/h for a period longer than or equal to X seconds and no direction indicator are operating. The individual-difference learning device 3213 stores the calculation results from occasion-focused learning and accuracy-focused learning into the learning data storage 333 as learning data.

(3) Individual Difference Correction Value Calculation and Driver State Determination (3-1) When Accuracy-Focused Learning is Insufficient The driver state determination apparatus 30 then uses the driver state determiner 3214 to calculate an individual difference correction value for determining the state of the driver.

More specifically, the individual-difference learning device 3213 first determines whether the count of accuracy-focused learning for the learning data entered in the learning data storage 333 is at least N times (predetermined number)

in step S13. Herein, N is any integer indicating the count of the learning to be performed to produce results with sufficiently high accuracy.

The second condition is more relaxed than the first condition, and may thus be satisfied before the first condition. In the early stages after the start of driving of the vehicle, occasion-focused learning is performed more frequently than accuracy-focused learning. In step S13, the count of accuracy-focused learning is determined not to reach N times. In this case, the individual-difference learning device 3213 calculates a correction value in step S14 based on the learning data stored in the learning data storage 333, or specifically learning results from occasion-focused learning and accuracy-focused learning. The individual-difference learning device 3213 then determines to use the calculated correction value as the individual difference correction value in step S15.

The individual differences are calculated in step S14 through, for example, the calculation below. The correction value Lc is calculated using the equation below.

$$Lc=(Lh*Nh+Ll*(Nl/M))/(Nh+(Nl/M))$$

In this equation, Lh is the accuracy-focused learning value, Nh is the count of accuracy-focused learning, Ll is the occasion-focused learning value, Nl is the count of occasion-focused learning, and M is the weighting constant. The weighting constant M may be any integer. More specifically, the occasion-focused learning value Ll weighs only 1/M of the accuracy-focused learning value Lh. The occasion-focused learning value Ll obtained through occasion-focused learning performed M times equates to the value Lh obtained through accuracy-focused learning performed one time.

The vehicle power system is turned on after the vehicle stops completely and enters a parking state. Thus, as shown in FIG. 5, no statistical information is actually calculated at time t0, or when the vehicle power system is turned on and learning is started in steps S11 and S12. In this case, the accuracy-focused learning value Lh, the count of accuracy-focused learning Nh, the occasion-focused learning value Ll, and the count of occasion-focused learning Nl are all 0, and the correction value Lc is 0. In FIG. 5, broken lines indicate the start and the end of each predetermined period (X seconds), and unhatched areas for accuracy-focused learning and for occasion-focused learning indicate that no actual learning is being performed during these periods.

In step S16, the driver state determiner 3214 in the driver state determination apparatus 30 determines the state of the driver using the individual difference correction value. For example, the driver state determiner 3214 corrects the current face or gaze direction of the driver, which is determined based on the monitoring data stored in the monitoring data storage 331, using the above individual difference correction value, and thus corrects the face or gaze direction of the driver. The corrected direction of the face or gaze of the driver is then compared with the predetermined reference direction. The resultant deviation of the face or gaze direction of the driver from the reference direction is used to determine the state of the driver including a distracted or undistracted state of the driver.

When the individual difference correction value is 0, the vehicle is likely to have stopped or be immediately after started, be rounding a curve on a road, turning right or left, or changing lanes under the first and second conditions. In this case, the driver state determiner 3214 may not determine the state of the driver.

In step S17, the driver state determiner 3214 uses the signal output unit 3215 to output the driver state determination result information indicating the state of the driver to the determination result output device 50. Thus, the driver state determination result information is presented through the determination result output device 50 to the driver by emitting an alert sound or lighting the alert lamp.

The driver state determination apparatus 30 hereafter repeats the processing in step S11 and subsequent steps described above.

(3-2) When Accuracy-Focused Learning is Sufficient

As described above, the processing from steps S11 to S17 is repeated and the N-th accuracy-focused learning is performed at time t1 as shown in FIG. 5. In step S13, accuracy-focused learning is determined to have been performed at least N times. In this case, the individual-difference learning device 3213 determines to use the accuracy-focused learning value Lh as the individual difference correction value in step S18.

The driver state determiner 3214 in the driver state determination apparatus 30 then determines the state of the driver in step S19 using the individual difference correction value. For example, the driver state determiner 3214 corrects the current face or gaze direction of the driver, which is determined based on the monitoring data stored in the monitoring data storage 331, using the above individual difference correction value, and thus corrects the face or gaze direction of the driver. The corrected direction of the face or gaze of the driver is then compared with the predetermined reference direction. The resultant deviation of the face or gaze direction of the driver from the reference direction is used to determine the state of the driver including a distracted or undistracted state of the driver.

In step S20, the driver state determiner 3214 uses the signal output unit 3215 to output the driver state determination result information indicating the state of the driver to the determination result output device 50. Thus, the driver state determination result information is presented through the determination result output device 50 to the driver by emitting an alert sound or lighting the alert lamp.

The driver state determination apparatus 30 hereafter repeats the processing in step S12 and subsequent steps described above. More specifically, the driver state determination apparatus 30 stops occasion-focused learning and subsequently performs accuracy-focused learning.

In this case as well, when the individual difference correction value is 0, the vehicle is likely to have stopped or be immediately after started, be rounding a curve on a road, turning right or left, or changing lanes under the first condition. In this case, the driver state determiner 3214 may not determine the state of the driver.

Advantageous Effects of First Embodiment

In the first embodiment described in detail above, the driver state determination apparatus 30 uses the driver state determiner 3214 to determine the face or gaze direction of the driver based on the monitoring data stored in the monitoring data storage 331, and uses the individual-difference learning device 3213 to repeatedly calculate statistical information about the direction in which the driver looking straight ahead retains his or her face or gaze with respect to the forward direction of the vehicle. Then, the individual-difference learning device 3213 corrects, based on the calculated statistical information, the determined direction of the face or gaze of the driver with respect to the reference direction defined as the forward direction of the vehicle, or corrects the reference direction. In other words, the forward direction (0°) in the driver's view is corrected to the forward direction (0°) used by the driver state determination apparatus, or specifically to the reference direction defined as the forward direction of the vehicle. This may be achieved by correcting the determination value for the face or gaze direction of the driver based on the first sensing data, or by correcting the reference direction defined as the forward direction of the vehicle. The driver state determiner 3214 then determines the state of the driver based on the deviation of the corrected direction of the face or gaze of the driver from the reference direction, or the deviation of the determined direction of the face or gaze of the driver from the corrected reference direction. The determination result is then output to the driver by the determination result output device 50. For example, the angle of 0° of the face or gaze direction of the driver, which differs depending on each driver, is corrected to the reference direction predefined by the driver state determination apparatus 30, or the angle of 0° in the forward direction of the vehicle. After the correction, the state of the driver including a distracted or undistracted state of the driver is determined. In other words, when the forward direction in the driver's view deviates from the angle of 0° in the direction used by the apparatus, the forward direction in the driver's view is used as the angle of 0° in the direction used by the apparatus. This eliminates the need for relaxing the criterion for detecting distracted driving depending on each driver, and thus enables accurate driver state determination achieving safety without being affected by differences between individual drivers.

In the driver state determination apparatus 30, the driver state determiner 3214 also determines whether to perform driver state determination using the vehicle information indicating the state of the vehicle, or to output the determination result through the determination result output device 50. In other words, the driver state determiner 3214 can determine whether to perform driver state determination in accordance with the state of the vehicle. When, for example, the vehicle is rounding a curve on a road, turning right or left, or changing lanes, the driver may act similarly as in distracted driving for safety checking. Such acts are prevented from being determined to be distracted driving. Any distracted driver is unlikely to cause problems when the vehicle is not moving, or is parked. The driver may act similarly as in distracted driving for safety checking particularly when starting a parked vehicle. The distracted driving determination may be disabled while the vehicle is parked and for a predetermined period after the vehicle is started until the vehicle travels a predetermined distance or until the vehicle reaches a predetermined speed. In some embodiments, the distracted driving determination may be performed without outputting the determination result to produce the same advantageous effects.

In the driver state determination apparatus 30, the individual-difference learning device 3213 may also perform accurate, infrequently performed accuracy-focused learning under the first condition excluding factors for erroneous learning, in parallel with less accurate, frequently performed occasion-focused learning under the second condition including the above factors for erroneous learning. This allows the driver state determiner 3214 to determine the state of the driver at earlier timing or immediately after the start of driving of the vehicle. In this case, the individual-difference learning device 3213 performs the correction process assigning a smaller weight to statistical information calculated through less accurate occasion-focused learning than statistical information calculated through more accurate accuracy-focused learning. The correction results can have intended accuracy or higher.

Known techniques described in, for example, Patent Literature 1 may perform correction only after distracted driving is detected several times, although ordinary drivers may be determined to be engaged in distracted driving only a limited number of times. Such techniques can thus take a long time before accurate determination for distracted driving is enabled. When a driver state determination apparatus, or for example a distracted driving determination apparatus that determines distracted driving, is combined with other apparatuses such as a driving assist apparatus or an automatic driving apparatus into one system, the system may have no information about the distance by which a vehicle needs to travel before accurate results can be obtained from the driver state determination apparatus. Without the information, the system cannot be built. The apparatus according to the first embodiment is advantageous in such a system in that the apparatus uses occasion-focused learning that provides determination results with sufficiently high accuracy in the early stages immediately after the start of driving of the vehicle.

The individual-difference learning device 3213 in the driver state determination apparatus 30 generates statistical information with sufficiently high accuracy over a predetermined number of calculations (N times) through accuracy-focused learning, and can then stop occasion-focused learning and calculate statistical information only through accuracy-focused learning. This eliminates excess calculations.

Also, the individual-difference learning device 3213 in the driver state determination apparatus 30 may calculate statistical information including the average and the deviation for the direction in which the driver looking straight ahead retains his or her face or gaze with respect to the forward direction of the vehicle during a predetermined period. Thus, statistical information is obtained easily.

Second Embodiment

A second embodiment of the present invention will now be described.
Configuration A driver state determination system including a driver state determination apparatus according to the second embodiment of the present invention has an overall configuration similar to that of the driver state determination system according to the first embodiment shown in FIG. 2. The driver state determination system according to the second embodiment includes a driver state determination apparatus 30, various sensors 41 to 46, and a determination result output device 50. The same components as the corresponding components of the driver state determination system according to the first embodiment will not be described, and components different from those described in the first embodiment will be described below.

The driver state determination apparatus 30 according to the second embodiment differs from the driver state determination apparatus 30 according to the first embodiment in the components described below.

In the second embodiment, a learning data storage 333 included in a storage unit includes a nonvolatile learning value table 3331 for storing learning data as shown in FIG. 6A in a nonvolatile manner, and a volatile learning value table 3332 for storing learning data as shown in FIG. 6B in a volatile manner.

The nonvolatile learning value table 3331 stores accuracy-focused learning values for each driver calculated through accuracy-focused learning performed previously as shown in FIG. 6A. More specifically, the nonvolatile learning value table 3331 stores, for each driver, accuracy-focused learning values, or statistical information including the average and the deviation for the retention direction in which each driver looking straight ahead retains his or her face or gaze with respect to the forward direction of the vehicle during a predetermined period, together with an identifier identifying the corresponding driver. In the example shown in FIG. 6A, the nonvolatile learning value table 3331 includes accuracy-focused learning values for three drivers. More specifically, when the forward direction used by the driver state determination apparatus, or specifically the reference direction defined as the forward direction of the vehicle is 0°, the retention direction of the face or gaze of the driver identified by driver identifier 1 has an average of −2.8° and a deviation of 1.8°. The retention direction of the face or gaze of the driver identified by driver identifier 2 has an average of +5.0° and a deviation of 1.0°. The retention direction of the face or gaze of the driver identified by driver identifier 3 has an average of +0.5° and a deviation of 2.0°. Although the stored retention direction is expressed herein using a positive value and a negative value indicating the right and the left from the reference direction, the direction may be expressed using a positive and a negative value indicating upward and downward from the reference direction. In some embodiments, both the right-left and up-down directions may be stored. In addition, for example, the tilt of the driver's head may be stored.

As shown in FIG. 6B, the volatile learning value table 3332 stores an accuracy-focused learning value, which is statistical information obtained through accuracy-focused learning, and the count of the learning performed, and an occasion-focused learning value, which is statistical information obtained through occasion-focused learning, and the count of the learning performed. In the example shown in FIG. 6B, when the reference direction is set to 0°, the retention direction of the face or gaze of the driver calculated through accuracy-focused learning has an average of +5.1° and a deviation of 1.1°, and indicates that the learning has been performed three times. In this example, the retention direction of the face or gaze of the driver calculated through occasion-focused learning has an average of +4.8° and a deviation of 1.3°, and the learning has been performed four times. The volatile learning value table 3332 uses positive and negative values to express the directions in the same manner as for the accuracy-focused learning values stored in the nonvolatile learning value table 3331.

The individual-difference learning device 3213 in the second embodiment, which performs accuracy-focused learning and occasion-focused learning in the same manner as described in the first embodiment, stops occasion-focused learning when finding statistical information approximate to the information calculated through the occasion-focused learning in the nonvolatile learning value table 3331. Thus, when the possibility of a driver change is detected, the individual-difference learning device 3213 stores statistical information calculated up until then through accuracy-focused learning into the nonvolatile learning value table 3331, and then starts calculating new statistical information through accuracy-focused learning and occasion-focused learning.

The driver state determiner 3214 can determine the possibility of a driver change based on the vehicle information stored in the vehicle information storage 332. For example, the driver state determiner 3214 can detect the possibility of a driver change by detecting the complete stop of the vehicle based on the sensing data from the speed sensor 42 and determining that the vehicle has entered the parking state based on the sensing data from the gear selector sensor 45 and/or the parking brake sensor 46. In some embodiments, the driver state determiner 3214 can also detect the possibility of a driver change based on the monitoring data stored in the monitoring data storage 331. For example, the driver may disappear temporarily from a monitoring image and then appear in a monitoring image again, or the monitoring data-based detection of the face or gaze of the driver may be temporarily disabled and then enabled again. In such a case, the possibility of a driver change can be detected. When detecting the possibility of a driver change in this manner, the driver state determiner 3214 outputs a driver change trigger signal to the individual-difference learning device 3213.

Operation

The operation of the driver state determination system with the above configuration will now be described.

Figure 7:
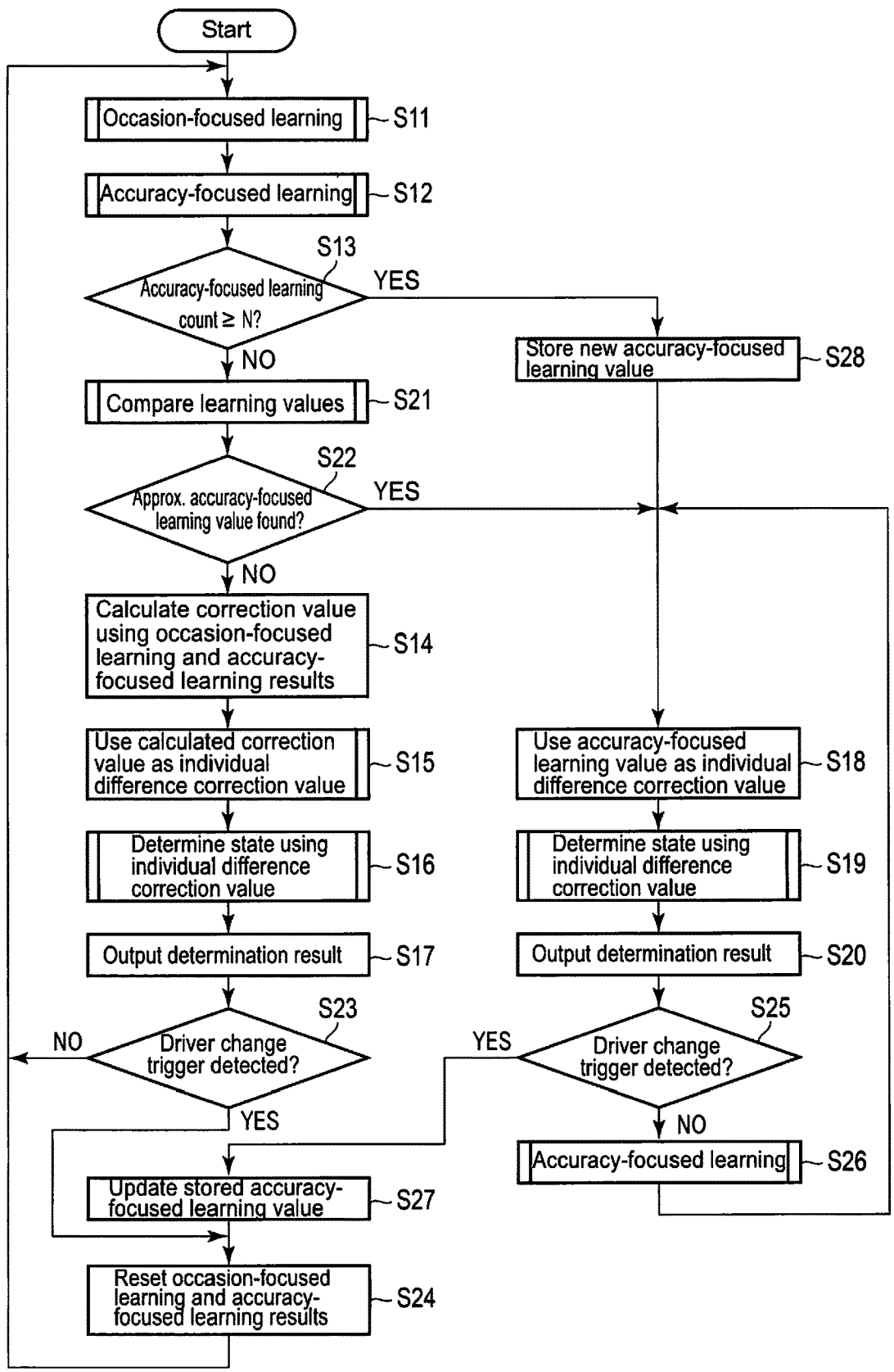
FIG. 7 is a flowchart showing the procedure and processing performed by the driver state determination system according to the second embodiment.
Figure 8:
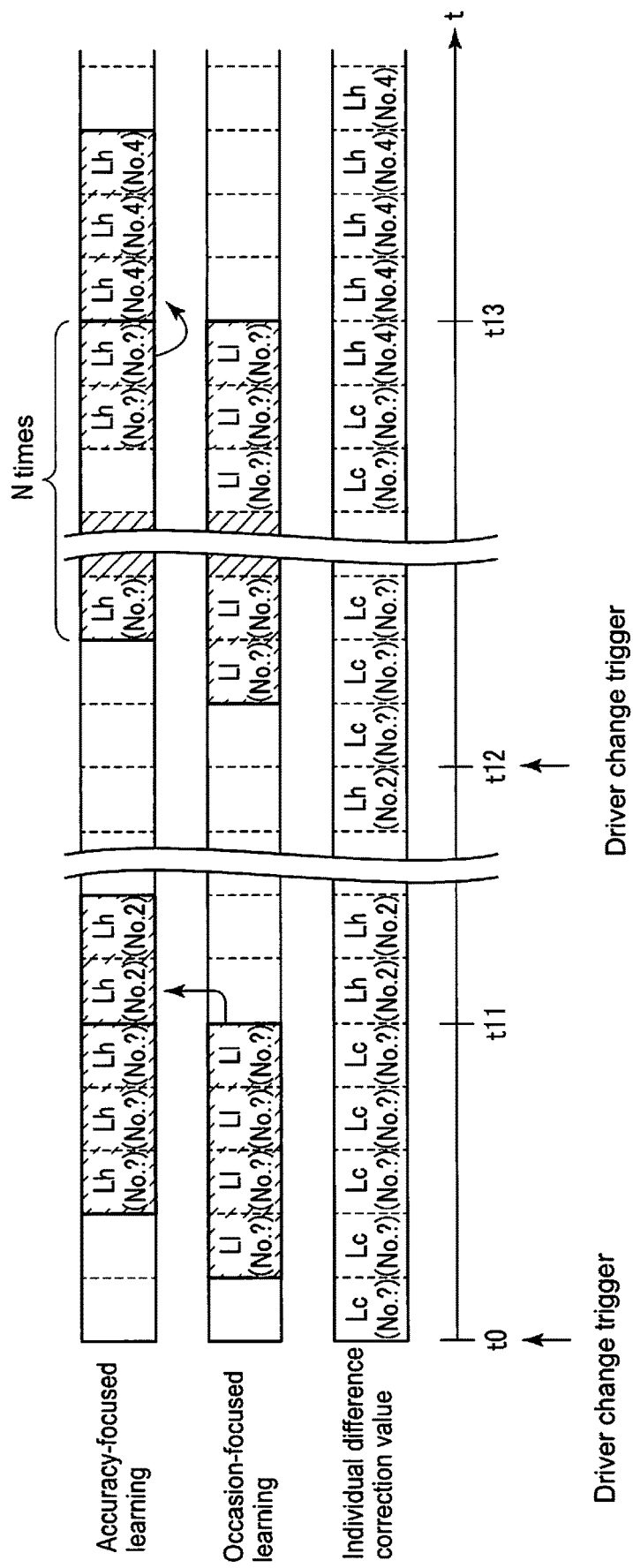
FIG. 8 is a time chart showing an example of learning that follows the procedure according to the second embodiment and the calculated individual difference correction values.

FIG. 7 is a flowchart showing the procedure and processing performed by the driver state determination system according to the second embodiment. FIG. 8 is a time chart showing an example of learning that follows the procedure according to the second embodiment and the calculated individual difference correction values.

(1) Receiving Sensing Data

When the vehicle power system is turned on, the driver state determination apparatus 30, the driver camera 41 serving as a driver monitoring sensor, and the sensors 42 to 46 serving as vehicle state sensors start operating as in the first embodiment. The monitoring data is stored into the monitoring data storage 331. The vehicle information is stored into the vehicle information storage 332. The sensing data is obtained and stored repeatedly until the vehicle power system is turned off.

(2) Statistical Information Learning

In parallel with the sensing data obtaining operation, the driver state determination apparatus 30 starts calculating statistical information through occasion-focused learning in step S11, and calculating statistical information through accuracy-focused learning in step S12. Steps S11 and S12 are the same as described in the first embodiment. The individual-difference learning device 3213 stores calculation results from occasion-focused learning and accuracy-focused learning into the volatile learning value table 3332 in the learning data storage 333 as learning data.

(3) Individual Difference Correction Value Calculation and Driver State Determination (3-1) When Accuracy-Focused Learning is Insufficient (3-1-1) with No Previous Learning The driver state determination apparatus 30 uses the driver state determiner 3214 to calculate an individual difference correction value for determining the state of the driver.

More specifically, the individual-difference learning device 3213 first determines whether the count of accuracy-focused learning for the learning data entered in the learning data storage 333 is at least N times (predetermined number) in step S13. In step S21, the individual-difference learning device 3213 determining that accuracy-focused learning has been performed less than N times compares the occasion-focused learning value stored in the volatile learning value table 3332 with the accuracy-focused learning value for each driver stored in the nonvolatile learning value table 3331 in the learning data storage 333. In step S22, the individual-difference learning device 3213 determines whether any accuracy-focused learning value approximate to the occasion-focused learning value is found, or whether such an accuracy-focused learning value has been learned previously. In this case, for example, not only the average but also the deviation of the retention direction for the face or gaze of the driver are used to reduce erroneous determination results.

When determining that no accuracy-focused learning value approximate to the occasion-focused learning value is found, the individual-difference learning device 3213 calculates a correction value based on the learning data stored in the volatile learning value table 3332, or the results of occasion-focused learning and accuracy-focused learning in step S14 as in the first embodiment. In step S15, the individual-difference learning device 3213 determines to use the calculated correction value as the individual difference correction value. In step S16, the driver state determiner 3214 in the driver state determination apparatus 30 determines the state of the driver using the above individual difference correction value. In step S17, the driver state determiner 3214 uses the signal output unit 3215 to output the driver state determination result information indicating the state of the driver to the determination result output device 50. Thus, the driver state determination result information is presented through the determination result output device 50 to the driver by emitting an alert sound or lighting the alarm lamp.

In step S23, the individual-difference learning device 3213 in the driver state determination apparatus 30 determines whether a driver change trigger signal has been input from the driver state determiner 3214. When determining that no driver change trigger signal has been input, the driver state determination apparatus 30 repeats the processing in step S11 and subsequent steps described above.

Thus, the driver state determination apparatus 30 operates in the same manner as described in the first embodiment when no accuracy-focused learning value approximate to the occasion-focused learning value is stored in the nonvolatile learning value table 3331 and no driver change trigger signal is input.

The vehicle power system is turned on after the vehicle stops completely and enters a parking state. Thus, as shown in FIG. 5, a driver change trigger signal is input at time t0, at which the vehicle power system is turned on. However, with step S11 yet to be started at time t0, the operation shown in the flowchart remains unaffected.

When a driver change trigger signal is subsequently input in the processing from steps S11 to S23 repeated in every predetermined period, the individual-difference learning device 3213 detects the input of the signal in step S23. In this case, the individual-difference learning device 3213 resets the learning data, or specifically the results of occasion-focused learning and accuracy-focused learning stored in the volatile learning value table 3332 in the learning data storage 333 in step S24. The driver state determination apparatus 30 hereafter repeats the processing in step S11 and subsequent steps described above.

(3-1-2) With Learning Performed Previously

When, for example, an accuracy-focused learning value (the average of +5.0° and the deviation of 1.0° identified by driver identifier 2) approximate to the above calculated occasion-focused learning value (an average of +4.8° and a deviation of) 1.3° is found as shown in FIG. 6B, an approximate accuracy-focused learning value is found at time t11 in the determination performed in step S22 shown in FIG. 8. In this case, the individual-difference learning device 3213 determines the driver currently driving the vehicle to be the driver with the approximate accuracy-focused learning value calculated. In this case, in step S18, the individual-difference learning device 3213 determines to use the approximate accuracy-focused learning value as the individual difference correction value. The driver state determination apparatus 30 then determines the state of the driver in step S19 with the driver state determiner 3214 using the above individual difference correction value. In step S20, the driver state determiner 3214 uses the signal output unit 3215 to output the driver state determination result information indicating the state of the driver to the determination result output device 50. Thus, the driver state determination result information is presented through the determination result output device 50 to the driver by emitting an alert sound or lighting the alarm lamp.

In step S25, the individual-difference learning device 3213 in the driver state determination apparatus 30 determines whether a driver change trigger signal has been input from the driver state determiner 3214. When determining that no driver change trigger signal has been input, the driver state determination apparatus 30 uses only accuracy-focused learning performed by the individual-difference learning device 3213 in step S26. The driver state determination apparatus 30 hereafter repeats the processing in step S18 and subsequent steps described above.

Thus, when an accuracy-focused learning value approximate to the calculated occasion-focused learning value is found in the nonvolatile learning value table 3331 and no driver change trigger signal is input, the driver state determination apparatus 30 operates in the same manner as for the count of accuracy-focused learning being at least N (predetermined number) times in the first embodiment.

Subsequently, in response to a driver change trigger signal input at time t12 as shown in FIG. 8 during the processing from steps S18 to S20, step S25, or step S23 repeated in every predetermined period, the individual-difference learning device 3213 detects the input of the signal in step S25. In step S27, the individual-difference learning device 3213 updates the nonvolatile learning value table 3331 with the accuracy-focused learning value included in the learning data stored in the volatile learning value table 3332 in the learning data storage 333. In step S24, the driver state determination apparatus 30 resets the learning data, or specifically the results of occasion-focused learning and accuracy-focused learning, stored in the volatile learning value table 3332, and repeats the processing in step S11 and subsequent steps described above.

When the accuracy-focused learning value in the volatile learning value table 3332 is to be stored in the nonvolatile learning value table 3331 in step S27, the accuracy-focused learning value is overwritten with the approximate accuracy-focused learning value determined in step S22. In this manner, the accuracy-focused learning value is updated for the driver. An identifier for the driver may be stored in the determination performed in step S22 to identify the accuracy-focused learning value to be overwritten in the nonvolatile learning value table 3331.

(3-2) When Accuracy-Focused Learning is Sufficient

When, for example, N-th accuracy-focused learning is performed at time t13 during the repetitive processing from steps S11 to S23 started at time t12 as shown in FIG. 8, the volatile learning value table 3332 in the learning data storage 333 stores the count of accuracy-focused learning being N times as shown in FIG. 6C. Thus, accuracy-focused learning is determined to have been performed at least N times in step S13. In this case, in step S28, the individual-difference learning device 3213 newly stores, into the nonvolatile learning value table 3331, the accuracy-focused learning value stored in the volatile learning value table 3332 as shown in FIG. 6D.

The processing then advances to step S18, and the procedure described above is performed.

To store the accuracy-focused learning value in the volatile learning value table 3332 into the nonvolatile learning value table 3331 in step S27 in response to a driver change trigger signal determined to have been input in step S25, the accuracy-focused learning value is overwritten with the accuracy-focused learning value newly stored in step S28 as described above. This updates the accuracy-focused learning value for the driver. An identifier for the driver may be stored when the new value is stored in step S28 to identify the accuracy-focused learning value to be overwritten in the nonvolatile learning value table 3331.

Advantageous Effects of Second Embodiment

As described above in detail, the driver state determination apparatus 30 according to the second embodiment produces the same advantageous effects as in the first embodiment.

In addition, the driver state determination apparatus 30 according to the second embodiment stores, into the nonvolatile learning value table 3331, accuracy-focused learning values for multiple drivers calculated previously, and stops occasion-focused learning performed by the individual-difference learning device 3213 when any accuracy-focused learning value approximate to the occasion-focused learning value calculated through the occasion-focused learning is found in the nonvolatile learning value table 3331. In other words, the driver state determination apparatus 30 does not perform occasion-focused learning any further when finding any accuracy-focused learning value calculated previously approximate to the calculated occasion-focused learning value. Thus, when the driver currently driving the vehicle has the learning value calculated previously, the individual-difference learning device 3213 determines that the statistical information is correct although the statistical information has been calculated through accuracy-focused learning an insufficient number of times to achieve intended accuracy. Only accuracy-focused learning is then performed.

Also, the driver state determination apparatus 30 determining a possibility of a driver change stores, into the nonvolatile learning value table 3331, the accuracy-focused learning values that have been calculated up until then by the individual-difference learning device 3213, and causes the individual-difference learning device 3213 to newly start occasion-focused learning and accuracy-focused learning. The vehicle stops completely and enters a parking state usually before the vehicle power system is turned off. Thus, the possibility of a driver change is detected, and the accuracy-focused learning value that has been calculated up until then through accuracy-focused learning is stored into the nonvolatile learning value table 3331. Thus, the calculated accuracy-focused learning value is stored in the nonvolatile learning value table 3331 in a reliable manner. In particular, for a new driver for which the calculation through accuracy-focused learning is started, the calculation result, or the value calculated through accuracy-focused learning is stored in a reliable manner.

The driver state determiner 3214 in the driver state determination apparatus 30 determines whether the driver has been changed based on the monitoring data stored in the monitoring data storage 331 or the vehicle information stored in the vehicle information storage 332, and inputs a driver change trigger signal into the individual-difference learning device 3213. For example, the driver state determiner 3214 can detect the possibility of a driver change by detecting the complete stop of the vehicle based on the sensing data from a speed sensor and determining that the vehicle has entered the parking state based on the sensing data from a gear selector sensor and/or a parking brake sensor. In some embodiments, the driver state determiner 3214 may determine the possibility of a driver change based on the monitoring data transmitted from a driver camera serving as the driver monitoring sensor 21. The driver state determiner 3214 detects the possibility of a driver change when, for example, the driver disappears temporarily from a monitoring image and then appears in a monitoring image again, or when the detection of the face or gaze of the driver using monitoring data is temporarily disabled and then enabled again. In this manner, the driver state determiner 3214 can easily determine the possibility of a driver change based on the monitoring data or vehicle information. Also, the driver state determiner 3214 can easily determine the possibility of a driver change as described above without complicated personal authentication processing such as face recognition or a specific operation by the driver such as self-reporting of a driver change. With no personal authentication processing, this structure eliminates the need for higher program security level.

Modification

The embodiments of the present invention described in detail above are mere examples of the present invention in all respects. The embodiments may be variously modified or altered without departing from the scope of the present invention. More specifically, the present invention may be implemented as appropriate using the configuration specific to each embodiment.

(1) In the second embodiment described above, the occasion-focused learning value obtained through occasion-focused learning is compared with the accuracy-focused learning value stored in the nonvolatile learning value table 3331 in the learning data storage 333 to determine whether any approximate accuracy-focused learning value is found. Instead of an occasion-focused learning value, a correction value calculated using an occasion-focused learning value and an accuracy-focused learning value may be compared with an accuracy-focused learning value stored in the nonvolatile learning value table 3331 to determine whether any approximate accuracy-focused learning value is found.

Figure 9:
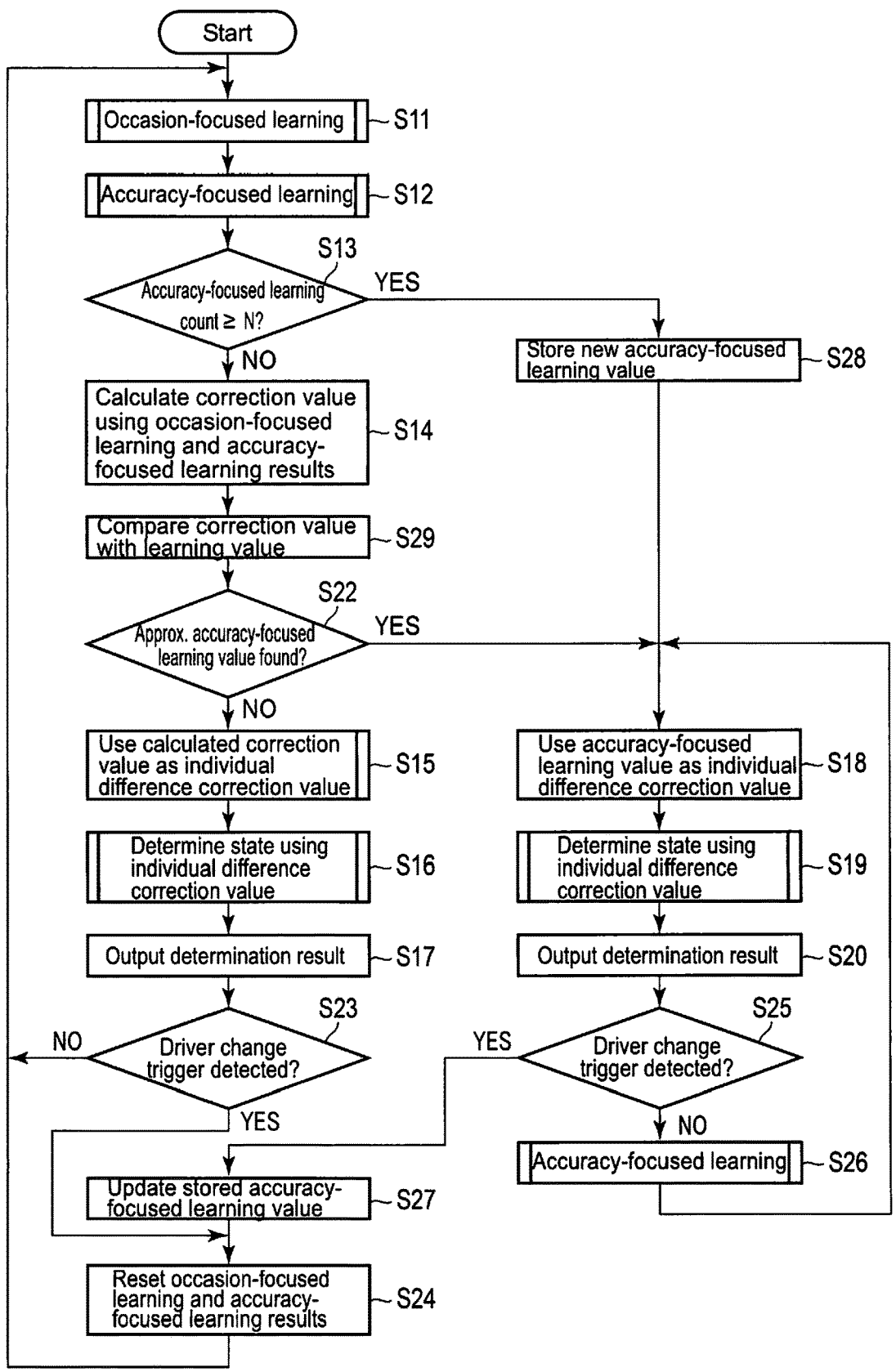
FIG. 9 is a flowchart showing the procedure and processing performed by the driver state determination system according to a modification of the second embodiment.

FIG. 9 is a flowchart showing the procedure and processing performed by the driver state determination system according to the present modification.

In this case, when the count of accuracy-focused learning has not reached N times in step S13, the individual-difference learning device 3213 calculates a correction value based on the learning data, or the results from occasion-focused learning and accuracy-focused learning stored in the volatile learning value table 3332 in step S14. In step S29, the individual-difference learning device 3213 compares the calculated correction value with the accuracy-focused learning value stored in the nonvolatile learning value table 3331. In step S22, the individual-difference learning device 3213 determines whether any accuracy-focused learning value approximate to the correction value is found, or whether such a value has been learned previously. When finding no accuracy-focused learning value approximate to the correction value, the individual-difference learning device 3213 determines to use the calculated correction value as the individual difference correction value in step S15. When finding an accuracy-focused learning value approximate to the correction value, the individual-difference learning device 3213 determines to use the approximate accuracy-focused learning value as the individual difference correction value in step S18.

The other processing is the same as described in the second embodiment.

This structure also produces the same advantageous effects as in the second embodiment. Further, this structure uses the correction value more accurate than the occasion-focused learning value, and thus determines an approximate accuracy-focused learning value with higher accuracy.

(2) Although accuracy-focused learning and occasion-focused learning are performed in the same predetermined period in the first and second embodiments described above, accuracy-focused learning and occasion-focused learning may be performed in different predetermined periods.

(3) When the state of the driver is determined in the first and second embodiments, the face or gaze direction of the driver, which is determined based on the monitoring data stored in the monitoring data storage 331, is corrected using the individual difference correction value, and the deviation of the corrected direction of the face or gaze of the driver from the reference direction is used for determining the state of the driver including a distracted or undistracted state of the driver. In other words, the constant reference direction is used, with which the face or gaze direction of the driver corrected based on the individual difference correction value is compared to determine the state of the driver. Conversely, the reference direction may be corrected based on the individual difference correction value as described in the first and second embodiments. The corrected reference direction may then be compared with the current face or gaze direction of the driver to determine the state of the driver. This structure also produces the same advantageous effects as in the first and second embodiments.

(4) In the second embodiment, for example, the driver state determiner 3214 determines the possibility of a driver change. In some embodiments, the individual-difference learning device 3213 may determine the possibility of a driver change based on monitoring data stored in the monitoring data storage 331 or vehicle information stored in the vehicle information storage 332. In other embodiments, a dedicated unit may be added as a driver-change possibility determiner. These modifications can also produce the same advantageous effects as in the second embodiment.

Additionally, the face or gaze direction of the driver may be detected by the monitoring data obtaining unit 3211 based on sensing data from the driver camera 41, and the detection result may be stored in the monitoring data storage 331.

The present invention is not limited to the embodiments described above, but the components may be modified without departing from the spirit and scope of the invention. The components described in the above embodiments may be combined as appropriate to provide various aspects of the invention. For example, some of the components described in each embodiment described above may be eliminated. Further, components in different embodiments may be combined as appropriate.

APPENDIXES

The embodiments described above may be partially or entirely expressed in, but not limited to, the following forms shown in the appendixes below.

Appendix 1

A driver state determination apparatus (10; 30), comprising:
a calculator (14; 3213) configured to determine a direction of a face or a gaze of a vehicle driver based on first sensing data output from a first sensor (21; 41) and including an image of the driver, and repeatedly calculate statistical information about a direction in which the driver looking straight ahead retains the face or the gaze with respect to a forward direction of a vehicle;
a correction unit (14; 3213) configured to correct, based on the statistical information calculated by the calculator, the direction of the face or the gaze of the driver determined by the calculator with respect to a reference direction defined as the forward direction of the vehicle, or correct the reference direction;
a first determiner (15; 3214) configured to determine a state of the driver based on a deviation of the direction of the face or the gaze of the driver corrected by the correction unit from the reference direction, or a deviation of the direction of the face or the gaze of the driver determined by the calculator from the reference direction corrected by the correction unit; and
an output unit (16; 3215, 50) configured to output a determination result from the first determiner to the driver.

Appendix 2

A driver state determination method implemented by a driver state determination apparatus (10; 30) configured to determine a state of a vehicle driver, the method comprising:
determining, with the driver state determination apparatus, a direction of a face or a gaze of the driver based on first sensing data output from a first sensor (21; 41) and including an image of the driver, and repeatedly calculating statistical information about a retention direction in which the driver looking straight ahead retains the face or the gaze with respect to a forward direction of the vehicle;
correcting, with the driver state determination apparatus, based on the calculated statistical information, the determined direction of the face or the gaze of the driver with respect to a reference direction defined as the forward direction of a vehicle, or correcting the reference direction;
determining, with the driver state determination apparatus, a state of the driver based on a deviation of the corrected direction of the face or the gaze of the driver from the reference direction, or a deviation of the determined direction of the face or gaze of the driver from the corrected reference direction; and
outputting, with the driver state determination apparatus, a determination result for the state of the driver to the driver.

Appendix 3

A driver state determination apparatus (30) comprising a hardware processor (321) and a memory (33), the hardware processor being configured to
determine a direction of a face or a gaze of a vehicle driver based on first sensing data output from a first sensor (41) and including an image of the driver, and repeatedly calculate statistical information about a retention direction in which the driver looking straight ahead retains the face or the gaze with respect to a forward direction of a vehicle,
correct, based on the calculated statistical information, the determined direction of the face or the gaze of the driver with respect to a reference direction defined as the forward direction of the vehicle, or correct the reference direction, determine a state of the driver based on a deviation of the corrected direction of the face or the gaze of the driver from the reference direction, or a deviation of the determined direction of the face or the gaze of the driver from the corrected reference direction, and output a determination result for the state of the driver to the driver.

Appendix 4

A driver state determination method implemented by an apparatus including a hardware processor (321) and a memory (33), the method comprising:

determining, with the hardware processor, a direction of a face or a gaze of a driver based on first sensing data output from a first sensor (41) and including an image of the driver, and repeatedly calculating statistical information about a retention direction in which the driver looking straight ahead retains the face or the gaze with respect to a forward direction of a vehicle;

correcting, with the hardware processor, based on the calculated statistical information, the determined direction of the face or the gaze of the driver with respect to a reference direction defined as the forward direction of the vehicle, or correcting the reference direction;

determining, with the hardware processor, a state of the driver based on a deviation of the corrected direction of the face or the gaze of the driver from the reference direction, or a deviation of the determined direction of the face or the gaze of the driver from the corrected reference direction; and outputting, with the hardware processor, a determination result for the state of the driver to the driver.

The invention claimed is:

1. A driver state determination apparatus comprising a processor and a memory, the processor being configured to:
   determine a direction of a face or a gaze of a vehicle driver based on first sensing data output from a first sensor and including an image of the driver to obtain a determined face or gaze direction, and repeatedly calculate statistical information about a direction in which the driver looking straight ahead retains the face or the gaze with respect to a forward direction of a vehicle;
   based on the statistical information, perform a correction of the determined face or gaze direction with respect to a reference direction defined as the forward direction of the vehicle to obtain a corrected face or gaze direction, or perform a correction of the reference direction to obtain a corrected reference direction;
   determine a state of the driver based on a deviation of the corrected face or gaze direction from the reference direction to obtain a determination result, or a deviation of the determined face or gaze direction from the corrected reference direction to obtain the determination result; and
   output the determination result to the driver, wherein
   the processor is configured to perform, as the correction:
      first learning comprising repeatedly calculating first statistical information as the statistical information, in response to detecting that the vehicle is traveling on a straight road at a speed equal to or higher than a first specified speed for a specified period of time or longer without changing lanes based on second sensing data output from a second sensor and representing a state of the vehicle, and detecting that the face or gaze direction is not unfixed based on the determined face or gaze direction;
      second learning comprising repeatedly calculating second statistical information as the statistical information, in response to detecting that the vehicle is traveling on a straight road at a speed lower than the first specified speed and equal to or higher than a second specified speed, which is lower than the first specified speed, for the specified period of time or longer without changing lanes based on the second sensing data; and
      assigning a smaller weight to the second statistical information than to the first statistical information, and correcting the direction of the face or the gaze of the driver or the reference direction.

2. The driver state determination apparatus according to claim 1, wherein
   the processor is configured to determine whether to perform driver state determination using second sensing data output from a second sensor and indicating a state of the vehicle or to output the determination result.

3. The driver state determination apparatus according to claim 1, wherein:
   the memory is configured to store statistical information calculated previously for a plurality of drivers, and
   the processor is configured to stop a calculation of the second statistical information when statistical information approximate to the second statistical information is stored in the memory.

4. The driver state determination apparatus according to claim 3, wherein
   when a possibility of a driver change is detected, the processor is configured to:
   store, into the memory, the statistical information calculated up until then, and
   start calculating new first statistical information and new second statistical information.

5. The driver state determination apparatus according to claim 4, wherein:
   the processor is further configured to determine a possibility of a driver change based on the first sensing data or the second sensing data.

6. The driver state determination apparatus according to claim 1, wherein
   the processor is configured to stop the calculation of the second statistical information when the first statistical information is calculated a predetermined number of times.

7. The driver state determination apparatus according to claim 6, wherein:
   the memory is configured to store statistical information calculated previously for a plurality of drivers, and
   the processor is configured to stop a calculation of the second statistical information when statistical information approximate to the second statistical information is stored in the memory.

8. The driver state determination apparatus according to claim 7, wherein
   when a possibility of a driver change is detected, the processor is configured to:
   store, into the memory, the statistical information calculated up until then, and
   start calculating new first statistical information and new second statistical information.

9. The driver state determination apparatus according to claim 8, wherein:

the processor is further configured to determine a possibility of a driver change based on the first sensing data or the second sensing data.

10. The driver state determination apparatus according to claim 1, wherein
the statistical information comprises an average and a deviation of the direction in which the driver looking straight ahead retains the face or gaze with respect to the forward direction of the vehicle during a predetermined period.

11. A driver state determination method implemented by a driver state determination apparatus comprising a processor and a memory, the method comprising:
determining, by the processor, a direction of a face or a gaze of the driver based on first sensing data output from a first sensor and including an image of the driver to obtain a determined face or gaze direction, and repeatedly calculating statistical information about a retention direction in which the driver looking straight ahead retains the face or the gaze with respect to a forward direction of a vehicle;
by the processor, based on the statistical information, performing a correction of the determined face or gaze direction with respect to a reference direction defined as the forward direction of the vehicle to obtain a corrected face or gaze direction, or performing a correction of the reference direction to obtain a corrected reference direction;
determining, by the processor, a state of the driver based on a deviation of the corrected face or gaze direction from the reference direction to obtain a determination result, or a deviation of the determined face or gaze direction from the corrected reference direction; and
outputting, by the processor, the determination result to the driver, wherein
performing the correction comprises:
by the processor, performing first learning of repeatedly calculating first statistical information as the statistical information, in response to detecting that the vehicle is traveling on a straight road at a speed equal to or higher than a first specified speed for a specified period of time or longer without changing lanes based on second sensing data output from a second sensor and representing a state of the vehicle, and detecting that the face or gaze direction is not unfixed based on the determined face or gaze direction, and
by the processor, performing second learning of repeatedly calculating second statistical information as the statistical information, in response to detecting that the vehicle is traveling on a straight road at a speed lower than the first specified speed and equal to or higher than a second specified speed, which is lower than the first specified speed, for the specified period of time or longer without changing lanes based on the second sensing data; and assigning, by the processor, a smaller weight to the second statistical information than to the first statistical information, and correcting the direction of the face or the gaze of the driver or the reference direction.

12. A non-transitory computer-readable storage medium storing a driver state determination program, the driver state determination program causing a processor in a driver state determination apparatus comprising the processor and a memory to:
determine a direction of a face or a gaze of the driver based on first sensing data output from a first sensor and including an image of the driver to obtain a determined face or gaze direction, and repeatedly calculate statistical information about a retention direction in which the driver looking straight ahead retains the face or the gaze with respect to a forward direction of a vehicle;
based on the statistical information, perform a correction of the determined face or gaze direction with respect to a reference direction defined as the forward direction of the vehicle to obtain a corrected face or gaze direction, or perform a correction of the reference direction to obtain a corrected reference direction;
determine a state of the driver based on a deviation of the corrected face or gaze direction from the reference direction to obtain a determination result, or a deviation of the determined face or gaze direction from the corrected reference direction to obtain the determination result; and
output the determination result to the driver, wherein
performing the correction comprises:
performing first learning comprising repeatedly calculating first statistical information as the statistical information, in response to detecting that the vehicle is traveling on a straight road at a speed equal to or higher than a first specified speed for a specified period of time or longer without changing lanes based on second sensing data output from a second sensor and representing a state of the vehicle, detecting that the face or gaze direction is not unfixed based on the determined face or gaze direction;
performing second learning comprising repeatedly calculating second statistical information as the statistical information, in response to detecting that the vehicle is traveling on a straight road at a speed lower than the first specified speed and equal to or higher than a second specified speed, which is lower than the first specified speed, for the specified period of time or longer without changing lanes based on the second sensing data; and
assigning a smaller weight to the second statistical information than to the first statistical information, and correcting the direction of the face or the gaze of the driver or the reference direction.

* * * * *